United States Patent [19]
Ori et al.

[11] Patent Number: 6,101,044
[45] Date of Patent: Aug. 8, 2000

[54] ZOOM LENS SYSTEM

[75] Inventors: Yuichiro Ori, Moriyama; Shigeto Ohmori, Kawachinagano, both of Japan

[73] Assignee: Minolta Co., Ltd., Osaka, Japan

[21] Appl. No.: 09/174,594

[22] Filed: Oct. 19, 1998

[30] Foreign Application Priority Data

Oct. 20, 1997 [JP] Japan ................................. 9-287072

[51] Int. Cl.[7] ............................................. G02B 15/14
[52] U.S. Cl. ...................... 359/691; 359/569; 359/570; 359/676; 359/680
[58] Field of Search .................... 359/691, 570, 359/573–574, 569, 676, 680, 682, 685

[56] References Cited

U.S. PATENT DOCUMENTS

| | | | |
|---|---|---|---|
| 5,268,790 | 12/1993 | Chen | 359/558 |
| 5,283,693 | 2/1994 | Kohno et al. | 359/691 |
| 5,493,441 | 2/1996 | Chipper | 359/354 |
| 5,619,381 | 4/1997 | Anderson | 359/677 |
| 5,745,301 | 4/1998 | Betensky et al. | 359/689 |
| 5,872,658 | 2/1999 | Ori | 359/677 |

FOREIGN PATENT DOCUMENTS

0544174 A1  6/1993  European Pat. Off. ........ G02B 13/14

*Primary Examiner*—Georgia Epps
*Assistant Examiner*—David N. Spector
*Attorney, Agent, or Firm*—Burns, Doane, Swecker & Mathis, LLP

[57] ABSTRACT

A zoom lens system has, from the object side, a first lens unit having a negative optical power and including at least one diffractive optical surface and a second lens unit having a positive optical power and including at least one diffractive optical surface. A distance between the first and second lens units varies during zooming operation.

27 Claims, 20 Drawing Sheets

FIG. 4
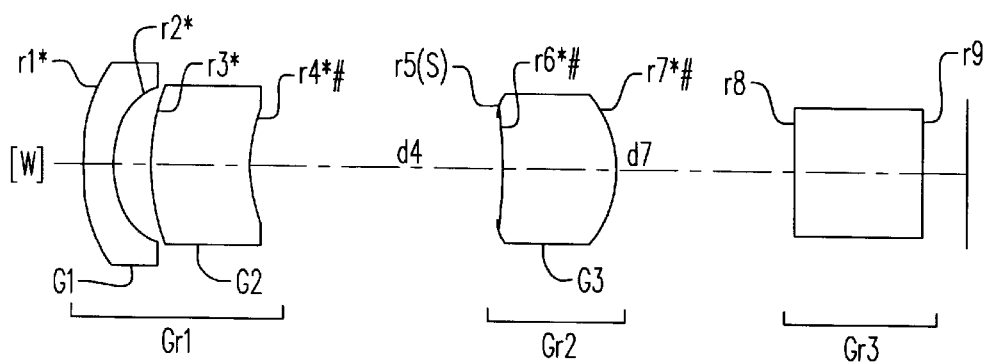
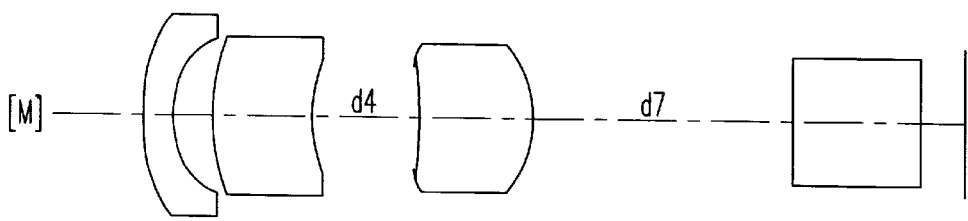
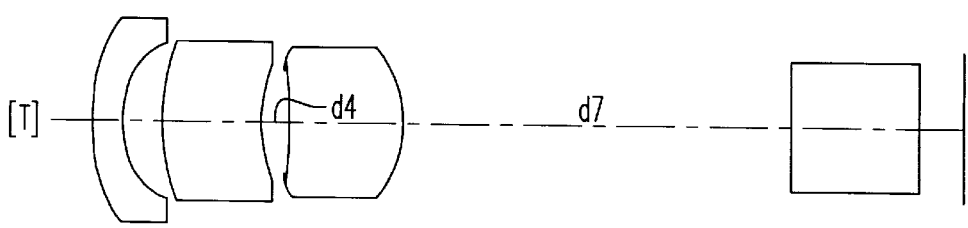

FIG. 5
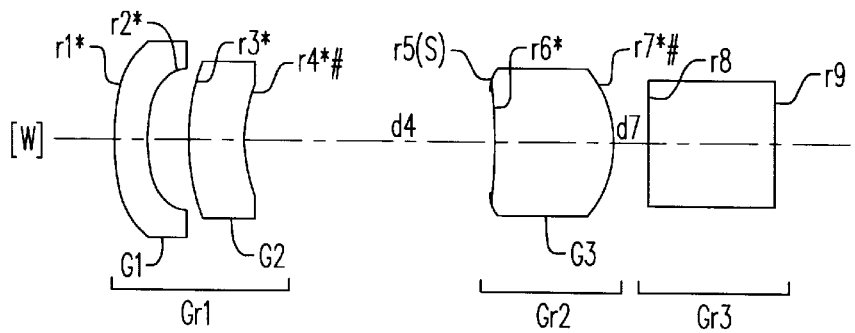
[W]
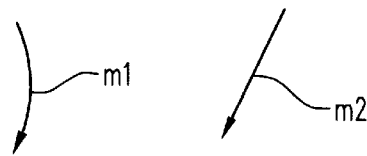
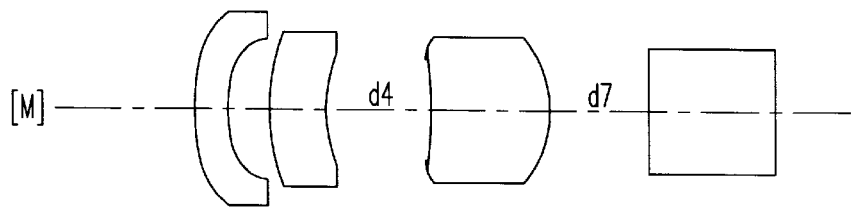
[M]
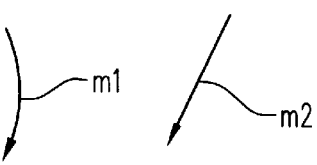
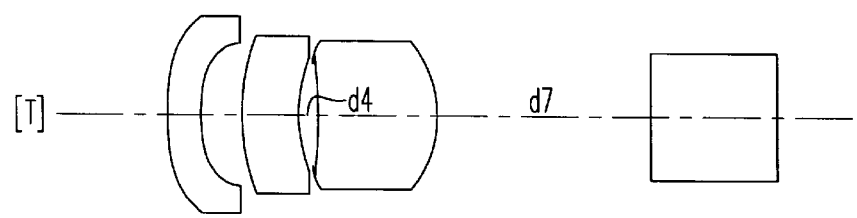
[T]

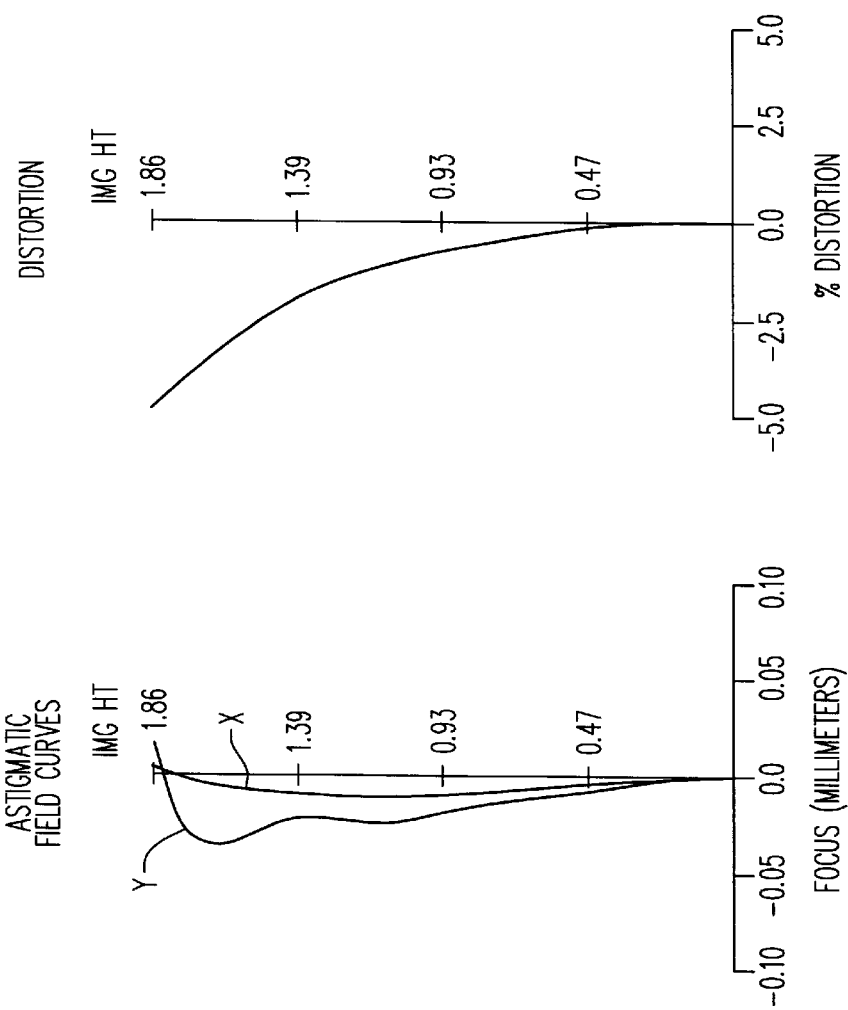
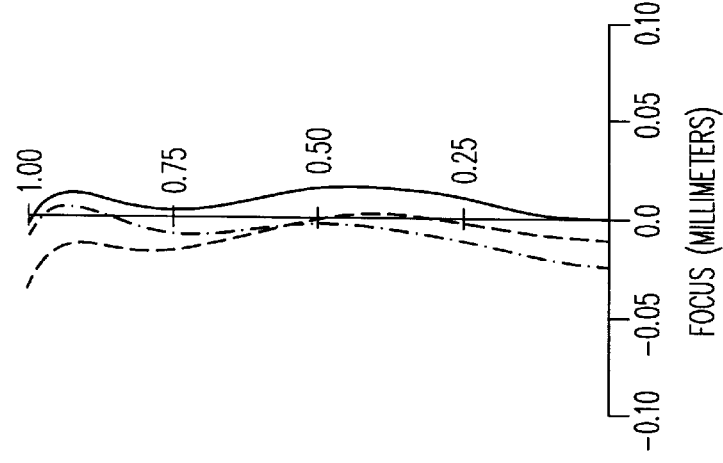
FIG. 6(a)  FIG. 6(b)  FIG. 6(c)

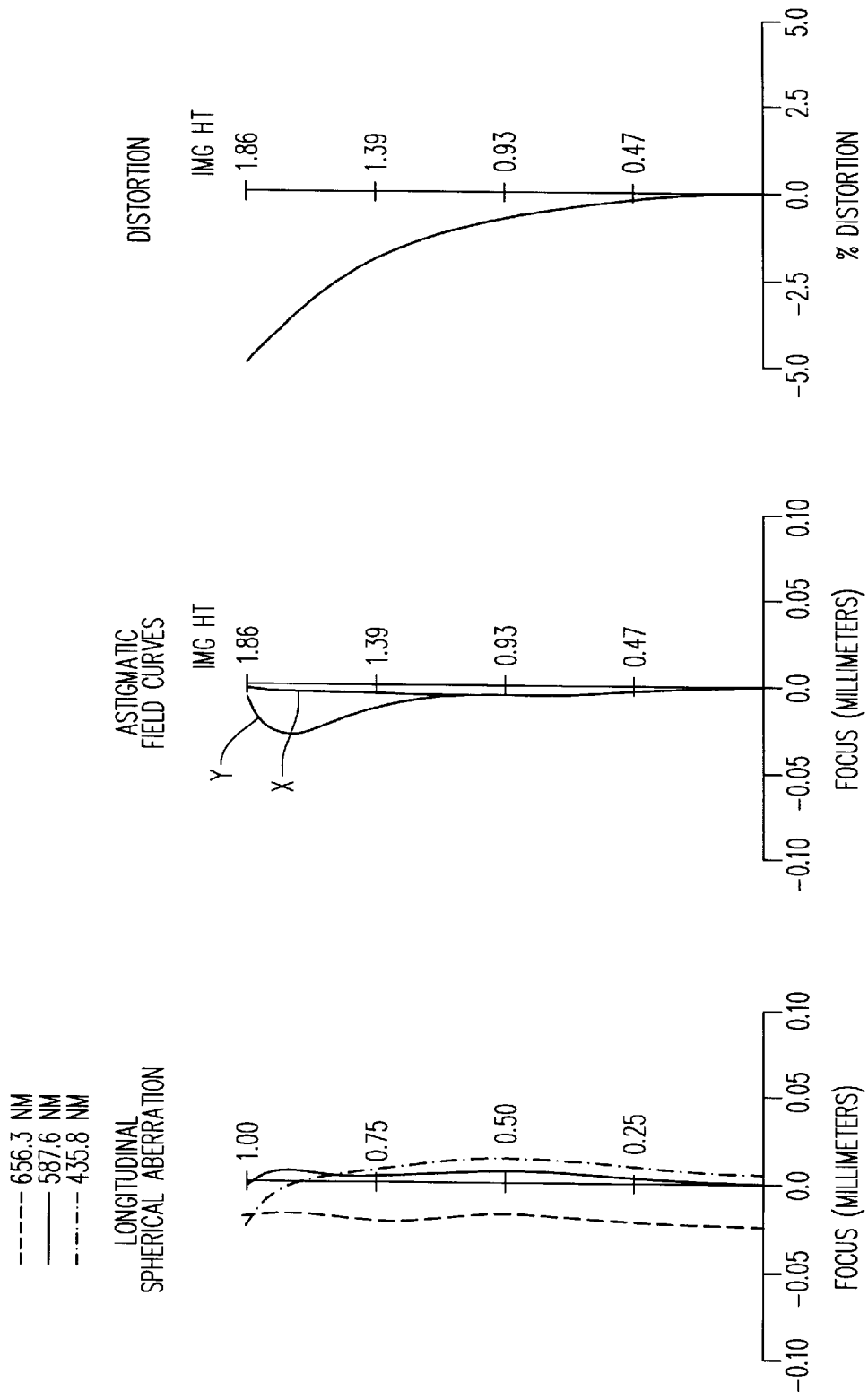

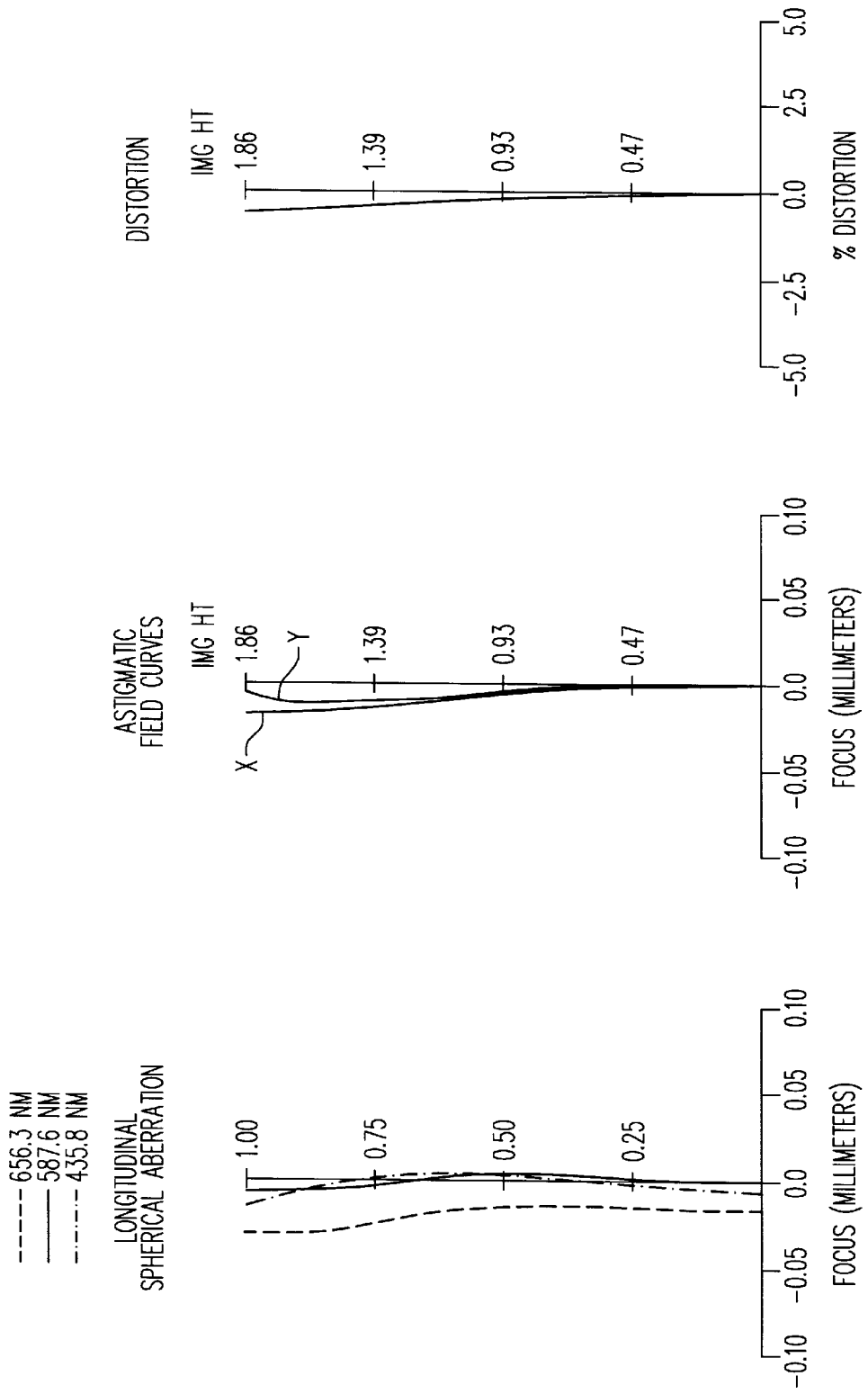

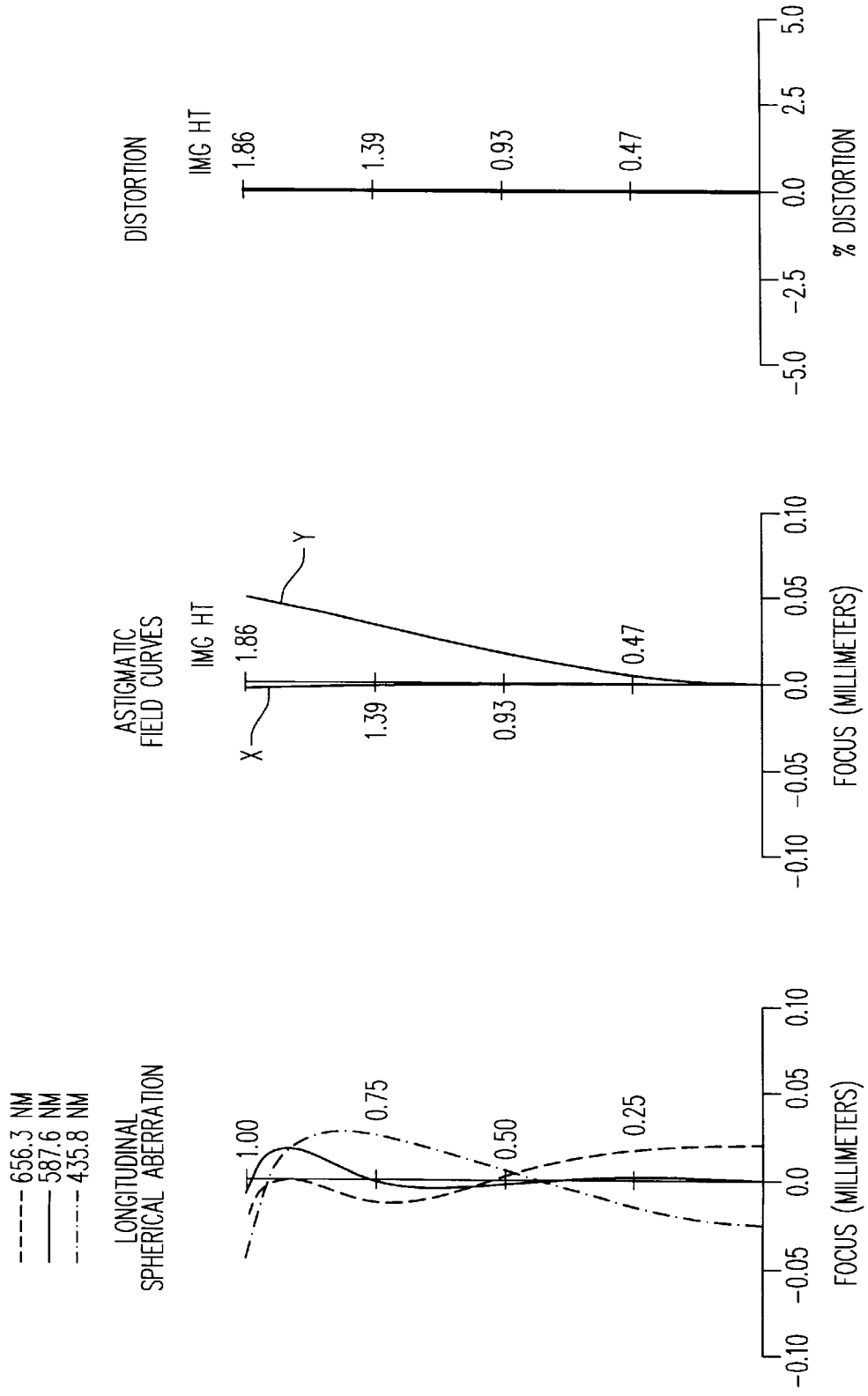

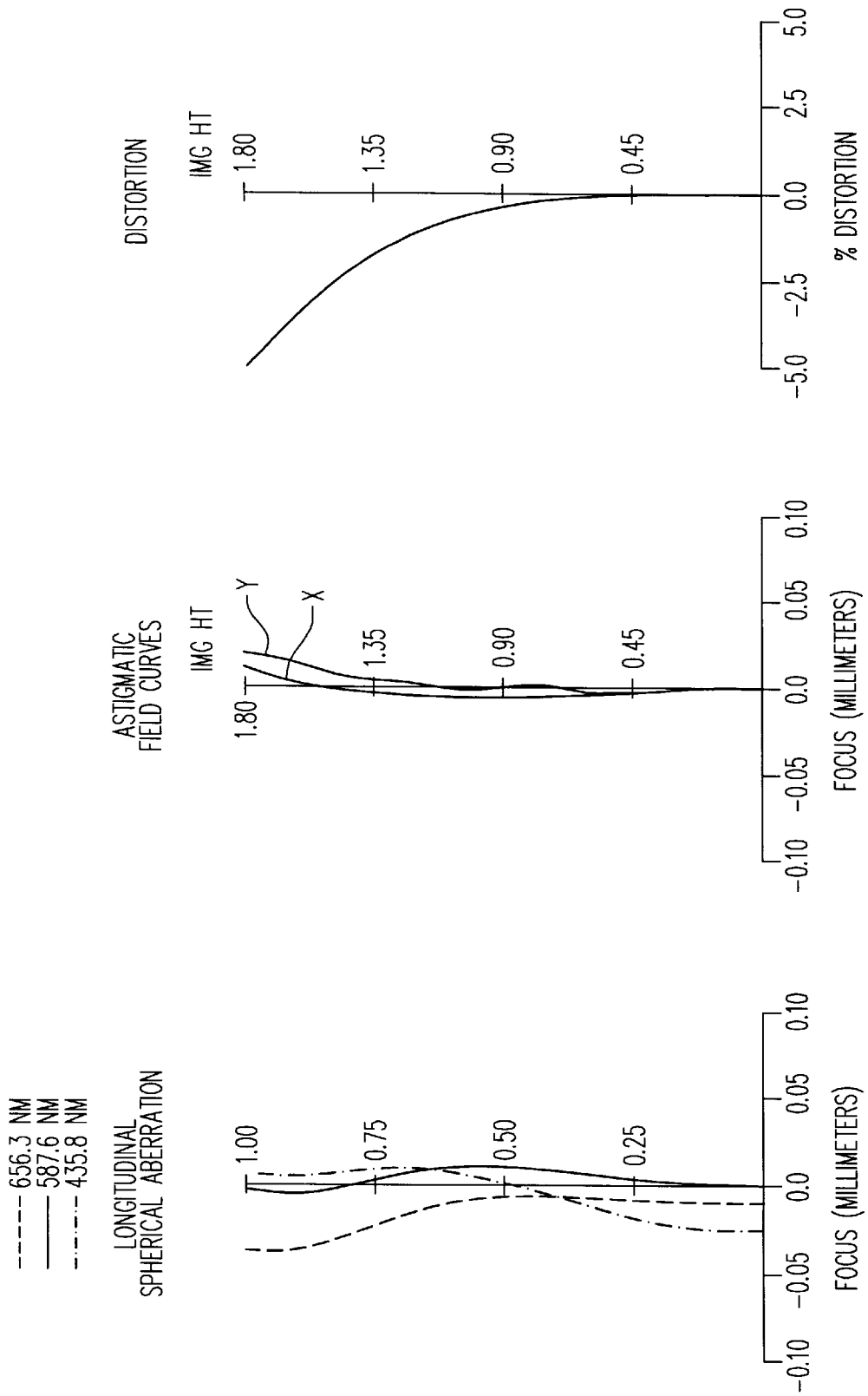

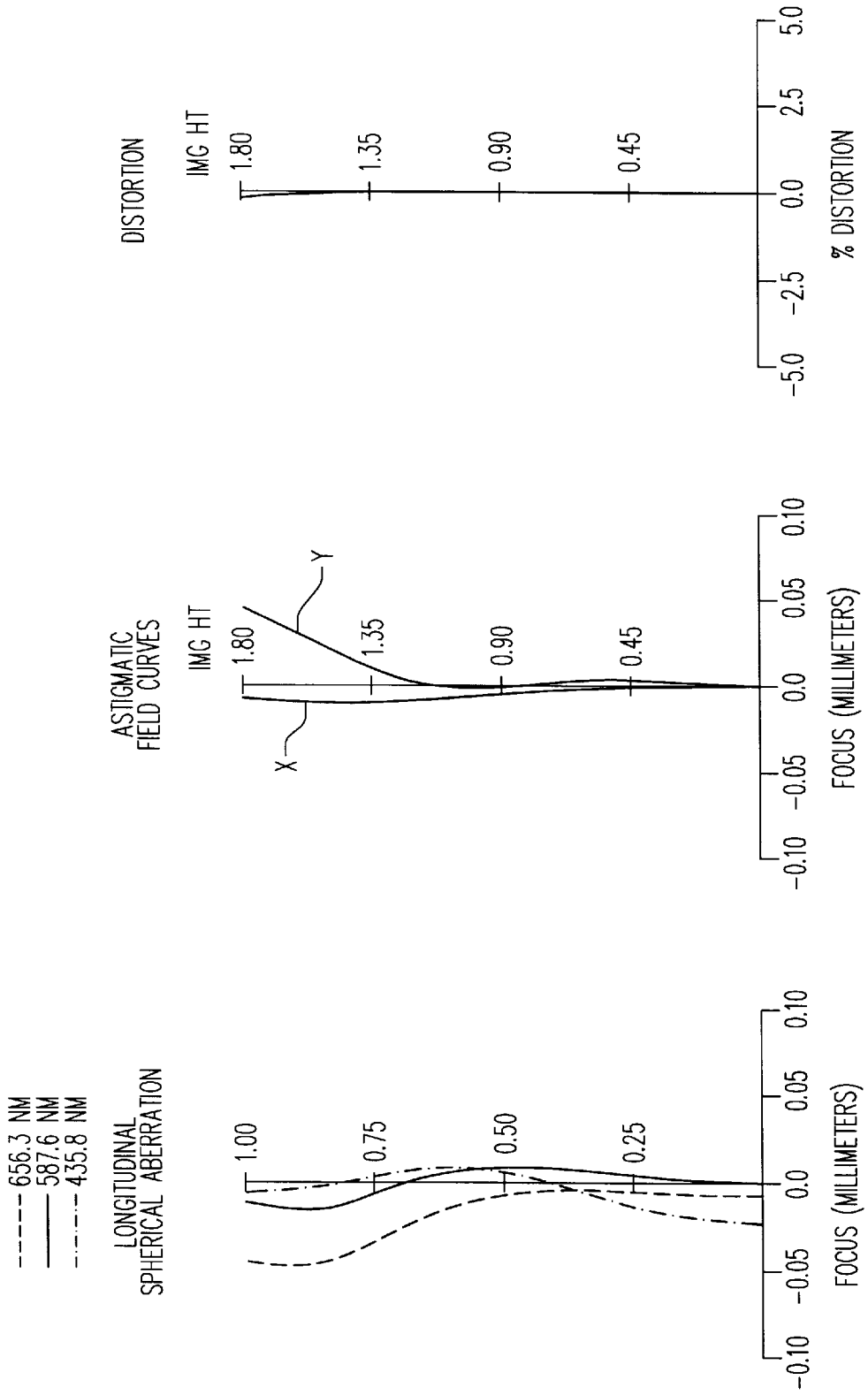

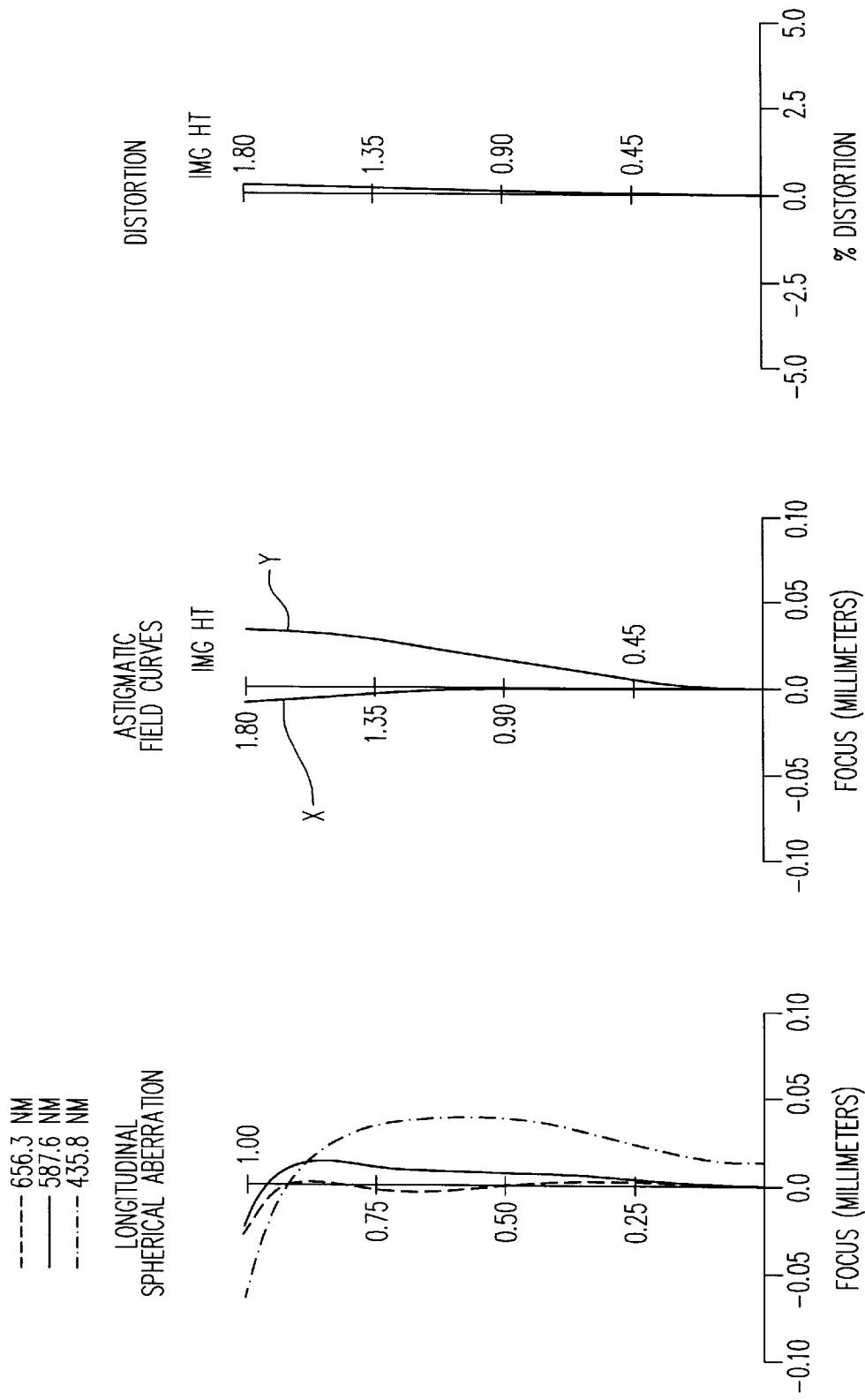

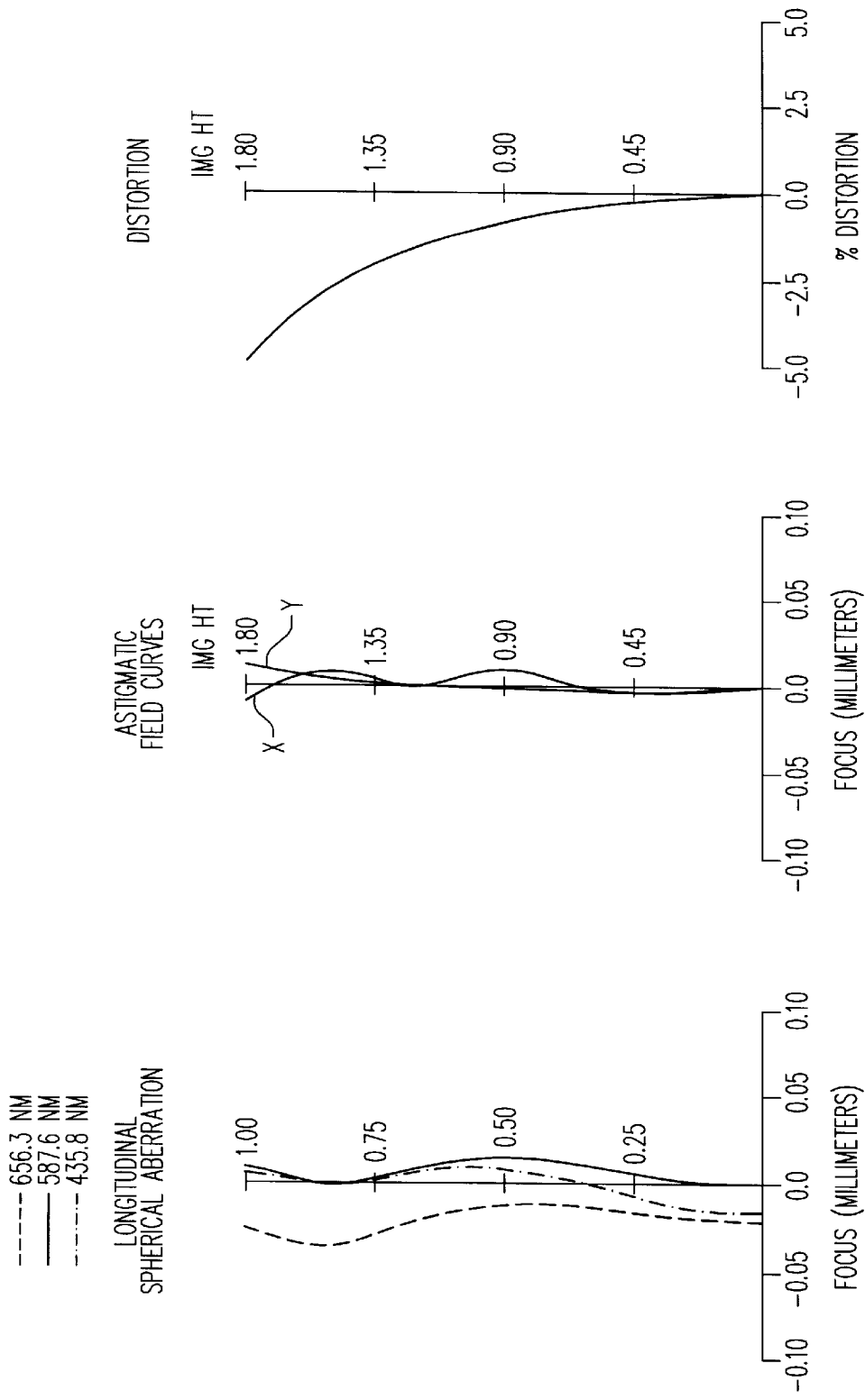

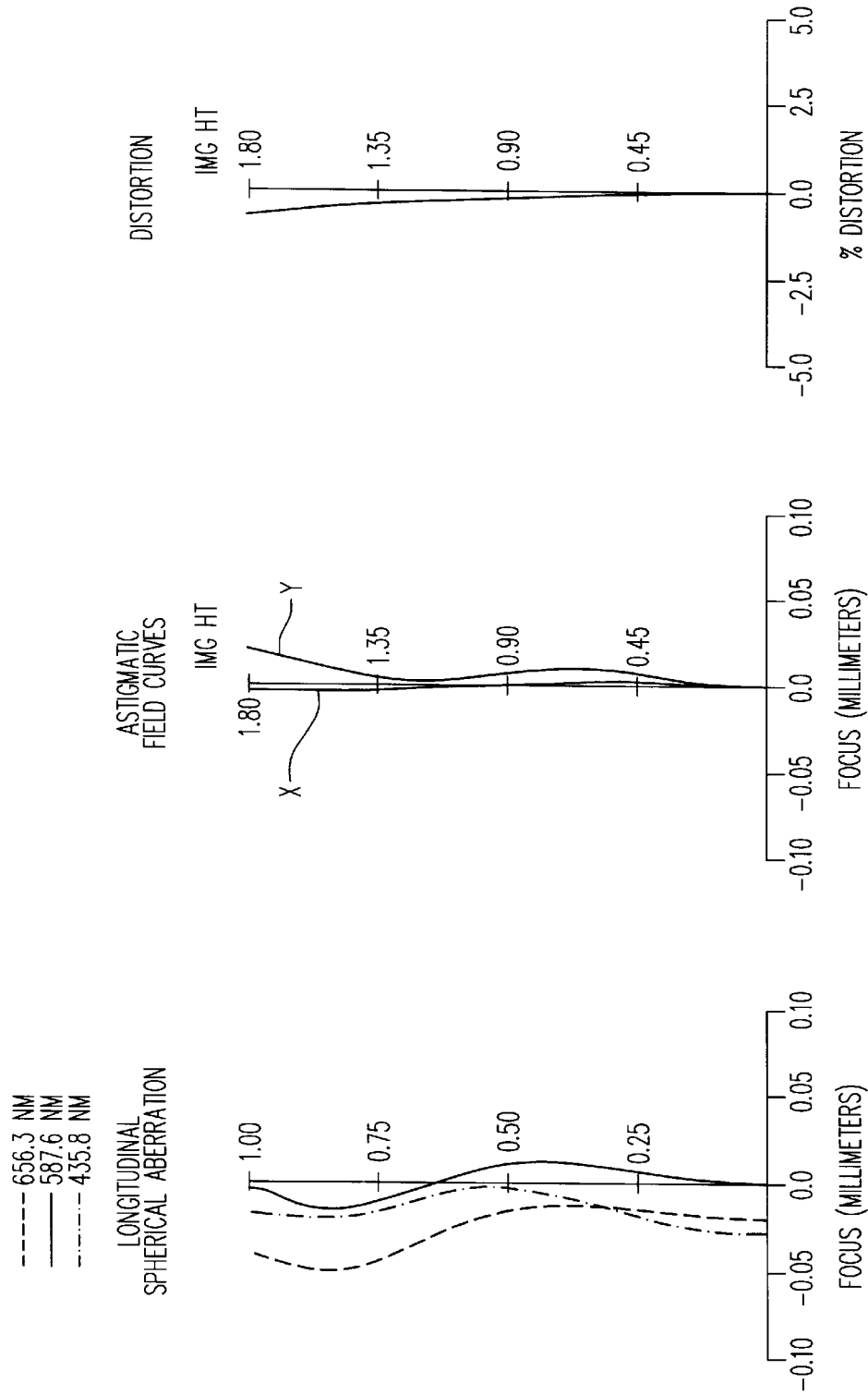

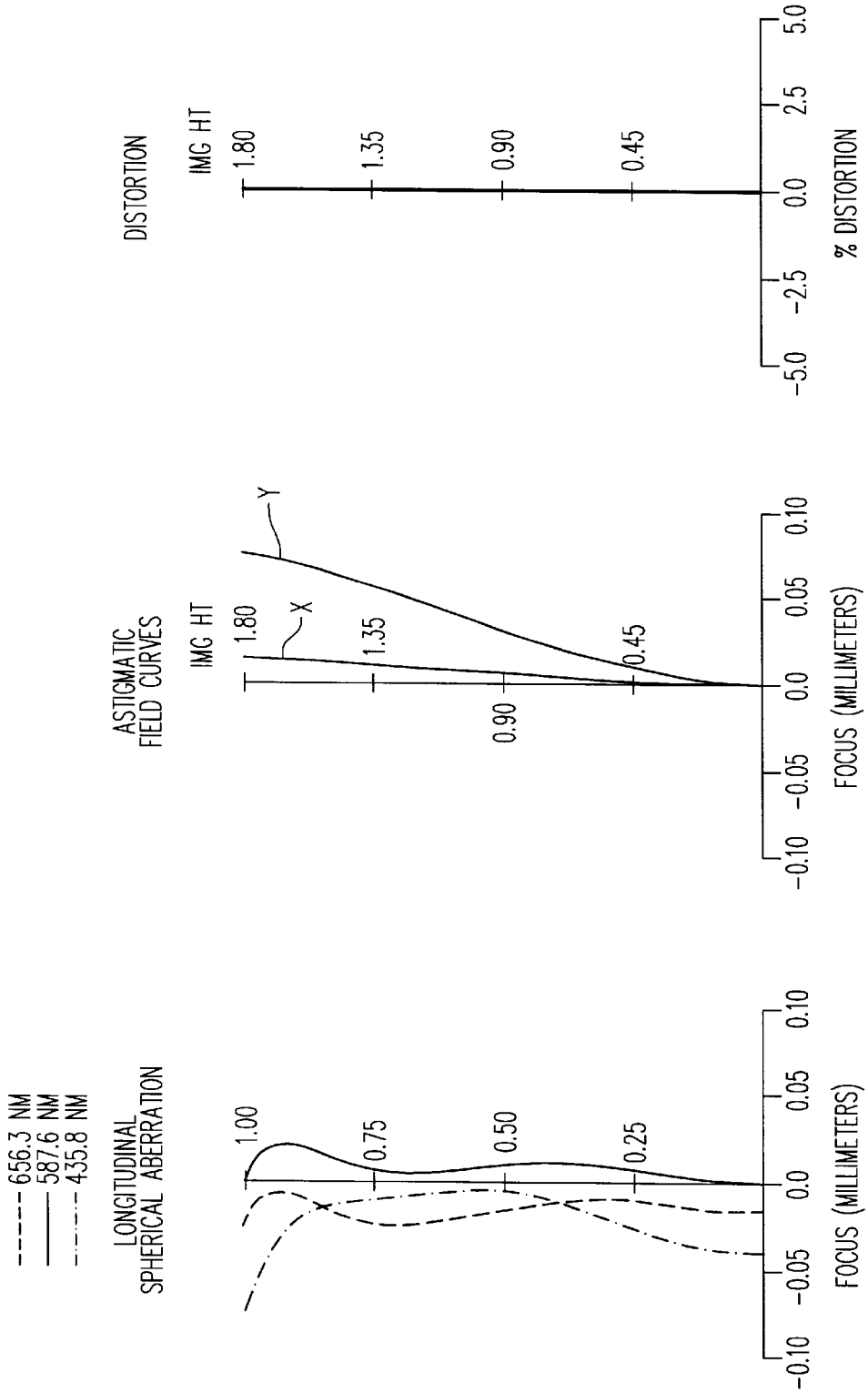

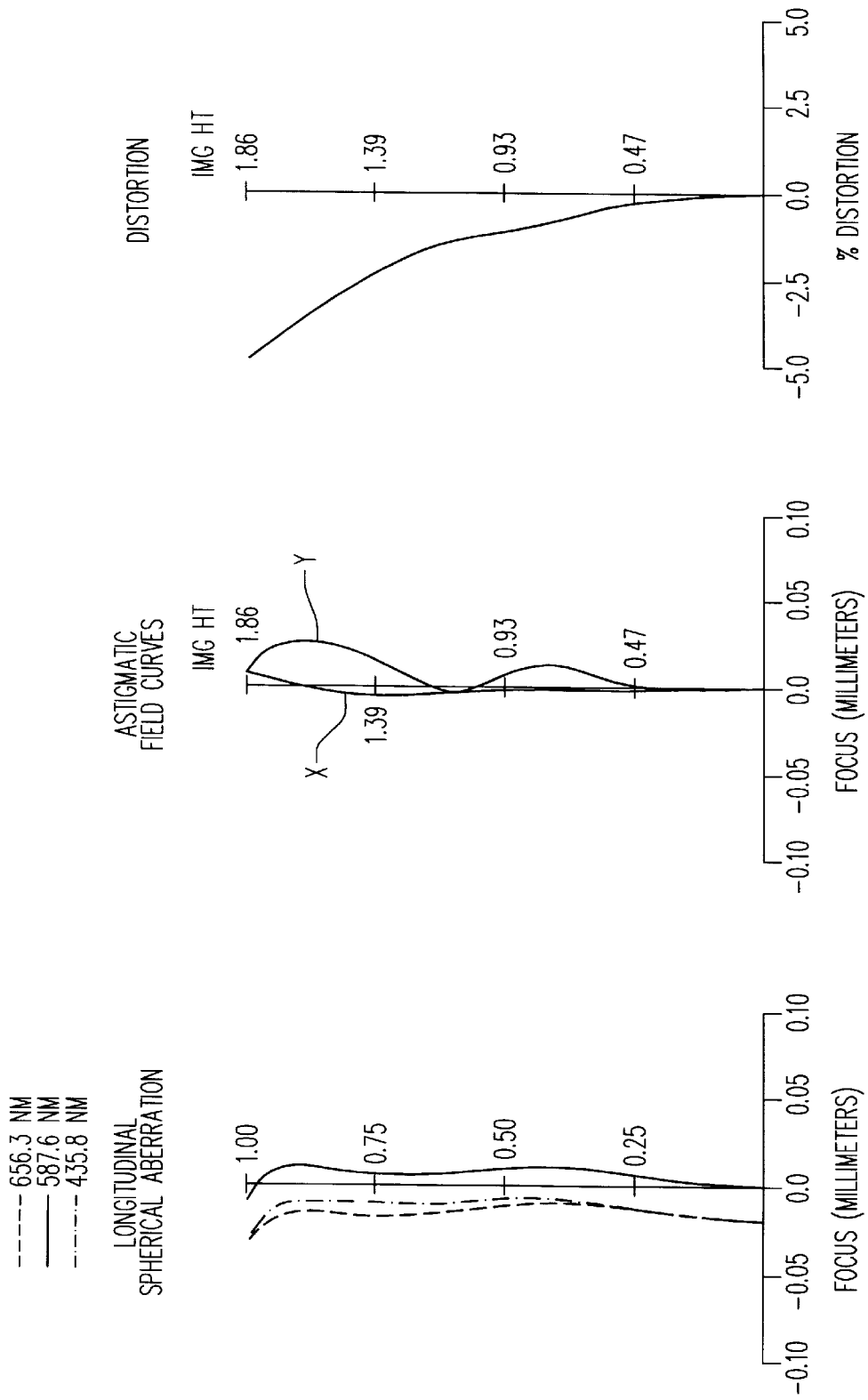

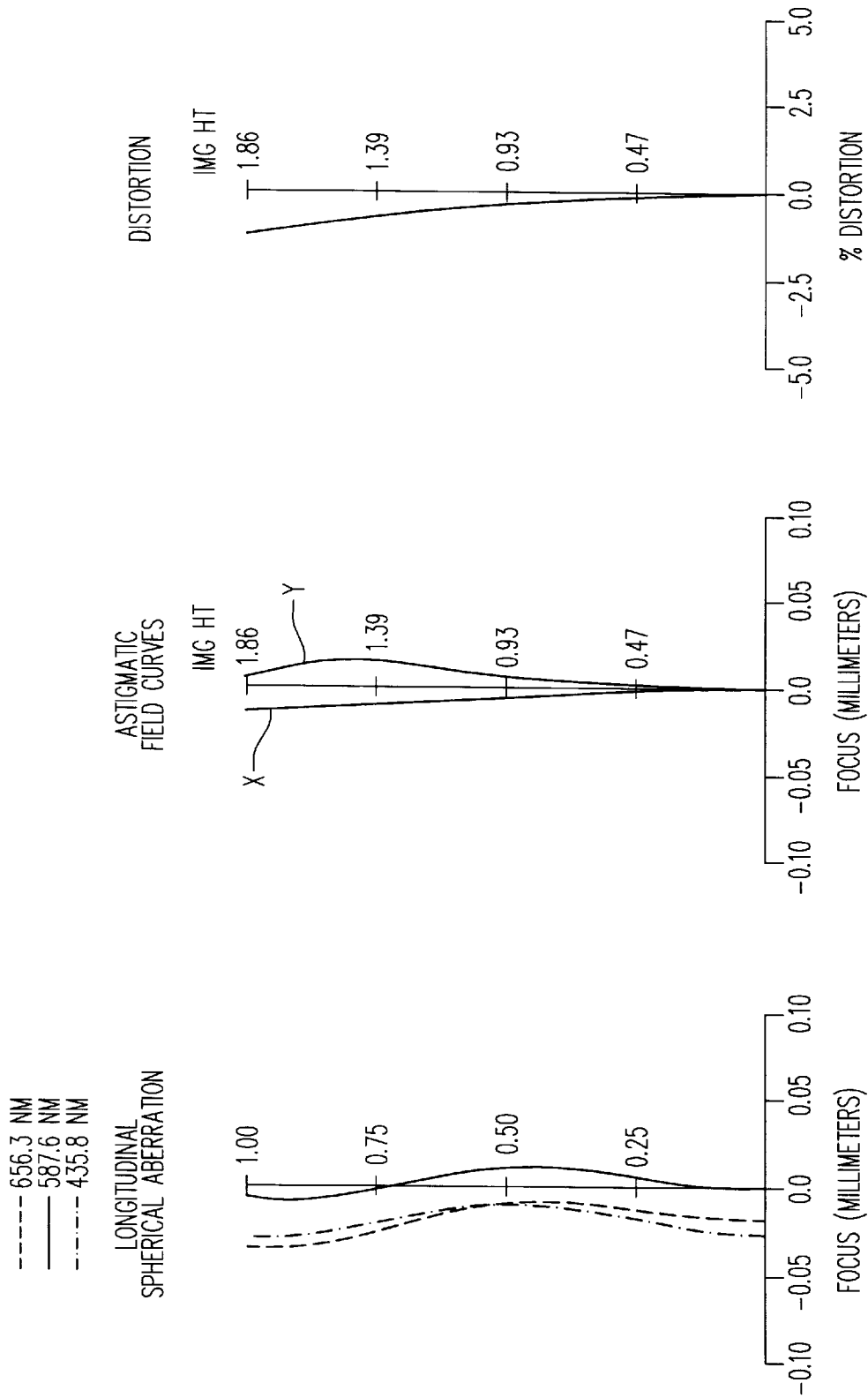

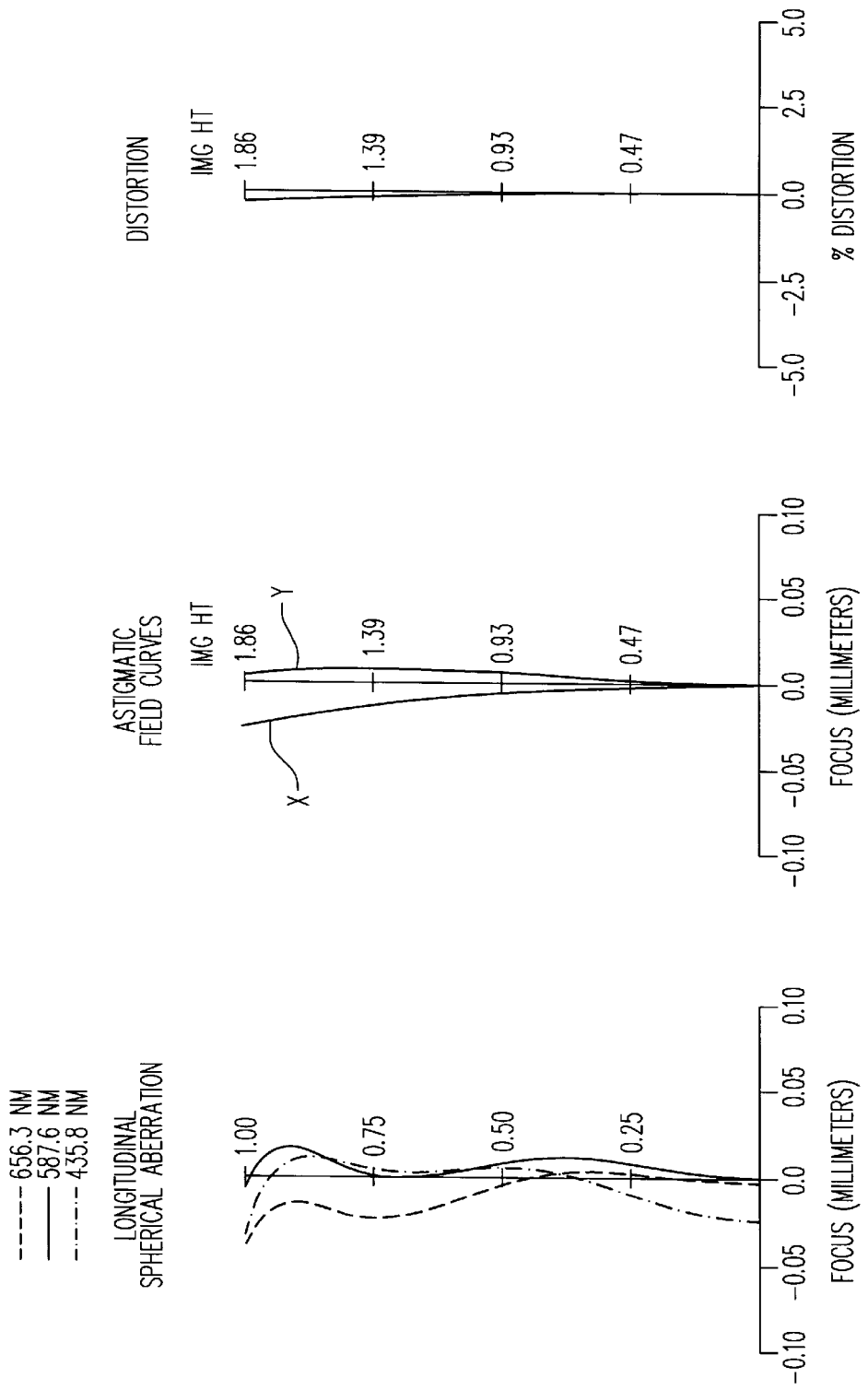

ZOOM LENS SYSTEM

RELATED APPLICATIONS

This application is based on application No. 9-287072 filed in Japan, the contents of which are hereby incorporated by reference.

BACKGROUND OF THE INVENTION

1. Field of the Invention

The present invention concerns a zoom lens system system and particularly concerns a zoom lens system system applicable to a video camera or a digital camera or the like.

2. Description of the Related Art

In recent, years a compact and low cost, yet high-performance zoom lens system has been sought as a zoom lens system used in a video camera or a digital camera wherein a CCD (charge coupled device) serves as an imaging device. To attain compactness in a zoom lens system, a means is generally adopted wherein the optical power of individual lens units is augmented and the amount of motion is reduced. Higher order aberrations thereby produced are suppressed by an aspherical surface, but an aspherical surface is not capable of correcting chromatic aberration, and a lens unit requiring correction of chromatic aberration requires at least two lenses.

At the same time CCD format size has experienced an ongoing trend of miniaturization, and miniaturization of overall lens size has consequently been sought. Yet when lenses are made smaller overall, sensitivity to accompanying manufacturing errors increases readily. Particularly in lens units comprising multiple lenses, there is an intensified sensitivity to degraded lens performance arising from air gap errors and decentering errors. Thus, if a lens unit could be constructed from a smaller number of lenses, not only could compactness be achieved effectively, the ability to manufacture more advantageously would allow cost reduction. Yet as discussed above, an aspherical surface is incapable of correcting chromatic aberration, which imposes a limit on using as few lenses as possible to construct a lens unit requiring correction of chromatic aberration.

In addition to an aspherical surface, the use of a refractive index distribution-type lens can reduce the number of lenses used in construction. A refractive index distribution-type lens has the ability to correct all aberrations including chromatic aberration and has a major effect on reducing the number of lenses used in construction. Yet in nearly all cases, an attempt to correct chromatic aberration in a design embodiment, by using a refractive index distribution-type lens results in dispersion and distribution in a negative direction, which is extremely problematic in manufacturing. As described above, it is extremely difficult to correct chromatic aberration through a construction with a small number of lenses.

It is a known fact, that a diffracting optical unit, has the ability to correct chromatic aberration, and there are numerous proposals to correct, the chromatic aberration of a lens used in a photographic camera or a CD (compact, disc) pickup by means of a combination of a diffracting optical unit and a refracting lens. For example, Japanese Laid-Open Patent Application No. 6-324262 discloses the application of a diffracting optical unit to an imaging lens. Nevertheless there is as yet no known zoom lens system with performance high enough to allow use in a camera employing a CCD or other such imaging unit and which is at the same time compact and low cost.

Japanese Laid-Open Patent Application No. 5-164965 and others propose a negative/positive two-component zoom lens systems and therein is a known mobile lens unit constructed from one refracting lens. Each two-component zoom lens system is nevertheless a zoom lens system with a magnification rate low enough for inexpensive applications such as lens-affixed films and does not attain performance satisfactory for a zoom lens system used in a camera employing a CCD or other such imaging unit.

SUMMARY OF THE INVENTION

An object of the present invention is to provide an improved zoom lens system.

A further object of the present invention is to provide a compact and low cost yet high-performance zoom lens system as a zoom lens system used in a camera wherein a CCD comprises an imaging unit.

A further object of the present invention is to provide a high-performance zoom lens system by means of a small number of constituent lenses.

In order to achieve the aforementioned objectives, a zoom lens system comprises, from the object side, a first lens unit having a negative optical power and including at least one diffractive optical surface and a second lens unit having a positive optical power and including at least one diffractive optical surface, wherein the distance between the first and second lens units varies during a zooming operation.

The invention itself, together with further objects and attendant advantages, will be understood by reference to the following detailed description taken in conjunction with the accompanying drawings.

BRIEF DESCRIPTION OF THE DRAWINGS

FIG. 4 is a lens configuration drawing pertaining to a fourth embodiment (Preferred Embodiment 4);

FIG. 5 is a lens configuration drawing pertaining to a fifth embodiment (Preferred Embodiment 5);

FIG. 6 is an aberration drawing at the wide angle extreme (W) of Preferred Embodiment 1;

FIG. 9 is an aberration drawing at the wide angle extreme (W) of Preferred Embodiment 2;

FIG. 10 is an aberration drawing at the middle (M) of Preferred Embodiment 2;

FIG. 11 is an aberration drawing at the telephoto extreme (r) of Preferred Embodiment 2;

FIG. 12 is an aberration drawing at the wide angle extreme (W) of Preferred Embodiment 3;

FIG. 13 is an aberration drawing at the middle (M) of Preferred Embodiment 3;

FIG. 14 is an aberration drawing at the telephoto extreme (T) of Preferred Embodiment 3;

FIG. 15 is an aberration drawing at the wide angle extreme (W) of Preferred Embodiment 4;

FIG. 16 is an aberration drawing at the middle (M) of Preferred Embodiment 4;

FIG. 17 is an aberration drawing at the telephoto extreme (T) of Preferred Embodiment 4;

FIG. 18 is an aberration drawing at the wide angle extreme (W) of Preferred Embodiment 5;

FIG. 19 is an aberration drawing at the middle (M) of Preferred Embodiment 5; and FIG. 20 is an aberration drawing at the telephoto extreme (T) of Preferred Embodiment 5.

In the following description, like parts are designated by like reference numbers throughout the several drawings.

DETAILED DESCRIPTION OF THE PREFFERED EMBODIMENTS

Figure 1:
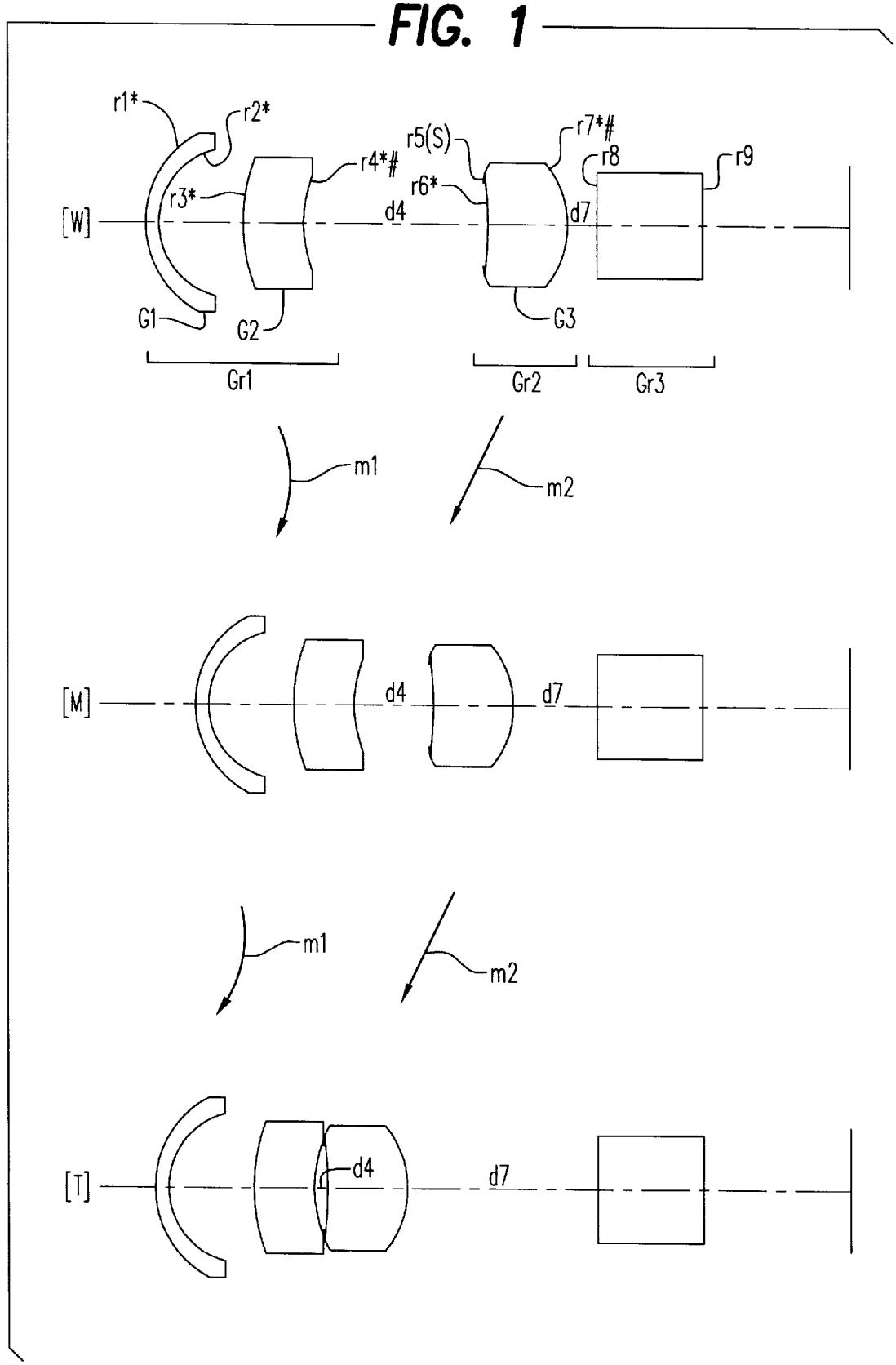
FIG. 1 is a lens configuration drawing pertaining to a first embodiment (Preferred Embodiment 1)
Figure 2:
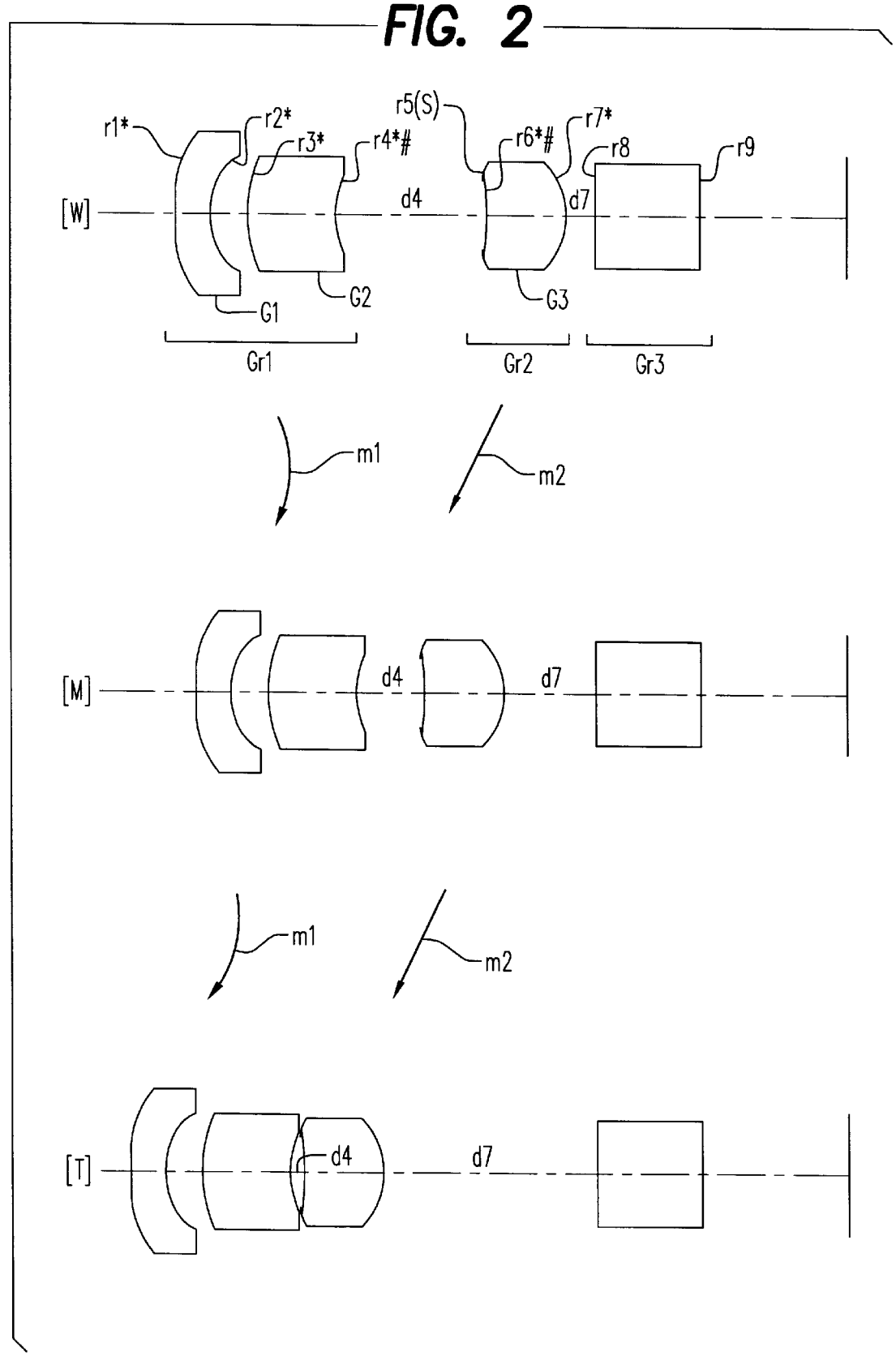
FIG. 2 is a lens configuration drawing pertaining to a second embodiment (Preferred Embodiment 2)
Figure 3:
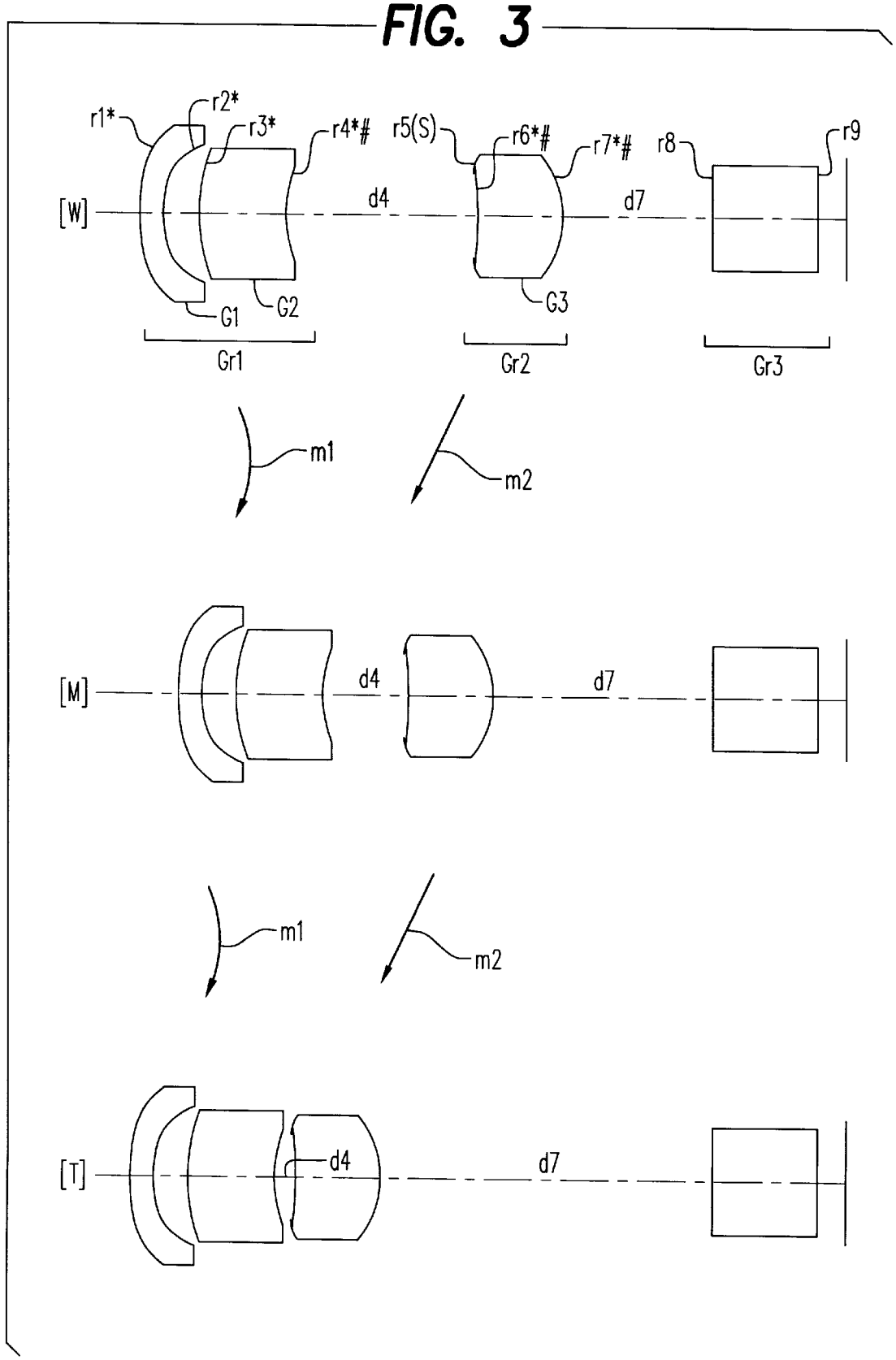
FIG. 3 is a lens configuration drawing pertaining to a third embodiment (Preferred Embodiment 3)

Preferred embodiments of the zoom lens system pertaining to the present invention are described below with reference to the drawings. FIGS. 1 through 5 are lens configuration drawings pertaining to Preferred Embodiments 1 through 5, respectively, and said figures show a lens positioned at the wide angle extreme (W), middle (state of middle focal distance) (M), and telephoto extreme (T). The arrows in each lens configuration drawing (m1, m2) illustrate representationally the movement, of a first lens unit (Gr1) and a second lens unit (Gr2) during zooming, and di (i=4,7) illustrates a distance able to be changed by zooming. In each lens configuration drawing, r(i=1,2,3 . . .) is the i-th order surface counting from the object side, ri marked with a (*) symbol is an aspherical surface, and ri marked with a (#) symbol is a diffracting optical surface.

Preferred Embodiments 1 through 5 are a zoom lens system comprising two components of, in order from the object side, a first lens unit (Gr1) possessing a negative optical power and a second lens unit, (Gr2) possessing a positive optical power, and said Preferred Embodiments are structured such that zooming is performed by changing the distance (d4) between the first lens unit (Gr1) and the second lens unit (Gr2). In each preferred embodiment, a low pass filter (Gr3) which is stationary during zooming is disposed on the image side of the second lens unit (Gr2), and a diaphragm (S) which moves and zooms together with the second lens unit (Gr2) is disposed between the first lens unit (Gr1) and the second lens unit (Gr2). The first lens unit (Gr1) comprises two meniscus lens elements (G1,G2) convex on the object side, and the second lens unit (Gr2) comprises one bi-convex lens element (G3).

Preferred embodiments 1 through 5 have a structure wherein a diffracting optical surface (i.e. a diffraction grating surface possessed by a diffracting optical unit) described by the phase function pertaining to the following equation (DS) is provided on at least one surface of the first lens unit (Gr1) and the second lens unit (Gr2) respectively.

$$\phi(H) = 2\pi \frac{\sum R_i \cdot H^i}{\lambda_0} \quad \text{(DS)}$$

wherein $\phi(H)$ represents a phase function,

H represents a height of vertical orientation with respect to optical axis,

Ri represents an i-th order phase coefficient, and $\lambda_0$ represents a design wavelength.

When a diffracting optical surface described by the equation (DS) is thus used in a positive/negative two-component zoom configuration, the extent of freedom for correction of aberrations is increased, and the large negative distributing effect of the diffracting optical surface allows correction of chromatic aberration with a small number of lenses. The number of lenses comprising an entire optical system can thus be reduced while maintaining high optical performance.

In Preferred Embodiments 1 through 5, the negative lens element (G1) on the object side which forms part of the first lens unit (Gr1) is structured so as to satisfy the following conditional expression.

$$0.4 < \frac{\phi 1f}{\phi 1} < 1.3 \quad (1)$$

wherein, $\phi 1f$ represents an optical power of object side lens element (G1) of first lens unit (Gr1), and $\phi 1$ represents a total optical power of first lens unit (Gr1).

This conditional expression (1) stipulates the optical power of the negative lens (G1) on the object side of the first lens unit (Gr1). If the first lens unit (Gr1) comprises two refracting lenses, a combination of a strong negative lens and a positive lens is needed in order to correct chromatic aberration. In such an instance, the negative optical power of the negative lens forming part of the first lens unit will generally be greater than the negative optical power of the first lens unit as a whole. A negative lens possessing such a strong negative optical power ultimately produces a particularly large negative distortion, off-axis coma, and curvature of field at the wide angle side, and spherical aberration at the telephoto side.

When the number of lenses comprising the first lens unit, is drastically reduced to 1–2 lenses, aberrations can no longer be fully corrected in the first lens unit alone. A need therefore arises to give the second lens unit a complex construction comprising 2–4 lenses in order to correct the produced aberrations in the second lens unit. If the optical power of the second lens unit as a whole is weakened, the optical power of the negative lens in the first lens unit can be weakened, but the amount of lens motion accompanying magnification change increases, and compactness suffers. The optical power of the negative lens can also be reduced by increasing the distance between the two lenses comprising the first lens unit, but a larger anterior lens effective diameter and total length offset compactness.

If the negative lens element (G1) is made to satisfy the conditional expression (1) as in Preferred Embodiments 1 through 5, the greatest part, of chromatic aberration can be corrected at the diffracting optical surface, and the optical power of the first lens element (G1) can therefore be greatly reduced in comparison to a conventional level. In this instance the optical power of the second lens element, (G2) can then be selected in a range from slightly positive to negative. The use of a diffracting optical unit in this manner allows the strong negative optical power in a first lens unit (Gr1) to be reduced and thereby allows the heretofore unknown construction of a 3× zoom lens system in which a second lens unit (Gr2) comprises one positive lens.

If the lower limit of the conditional expression (1) is not attained, the optical power of the first lens element, (G1) weakens, and curvature of field or coma balance at the wide angle side cannot be achieved. Conversely, if the upper limit of the conditional expression elements (1) is exceeded, the optical power of the first lens elements(G1) intensifies, and correction by the second lens unit (Gr2) of spherical aberration and the like arising at the telephoto side becomes problematic.

Preferred Embodiments 1 through 5 are constructed such that the first lens unit (Gr1) and the second lens unit (Gr2) satisfy the following conditional expression (2).

$$0.02 < \left|\frac{\phi d}{\phi}\right| < 0.1 \quad (2)$$

wherein

φd represents an optical power resulting from diffractive effect of individual lens unit, and φ represents an optical power of individual lens unit, and the following equations (a) and (b) describe (d and q respectively.

$$\phi d = -2mR2 \quad (a)$$
$$\phi = \phi r + \phi d \quad (b)$$

wherein, m represents a degree of diffraction,

R2 represents a second order phase coefficient, and

φr represents an optical power resulting from refractive effect, of individual lens unit.

This conditional expression (2) stipulates the optical power resulting from a diffractive effect in an individual lens unit. Satisfaction of the conditional expression (2) affords good correction of chromatic aberration. If the lower limit of the conditional expression (2) is not attained, the optical power resulting from the diffractive effect, of the diffracting optical surface is too weak, and correction of axial chromatic aberration in particular becomes problematic. Conversely, if the upper limit of the conditional expression (2) is exceeded, the optical power resulting from the diffractive effect of the diffracting optical surface is too strong, and correction of chromatic aberration becomes excessive.

In a two-component zoom lens system construction wherein a diffracting optical surface is provided on at least one surface of each lens units (Gr1,Gr2) as in Preferred Embodiments 1 through 5, it is desirable that the dispersion value of a positive lens element (G3) comprising the second lens unit (Gr2) satisfy the following conditional expression (3).

$$\nu 2 > 60 \quad (3)$$

wherein,

ν2 represents a dispersion value of positive lens element (C3) of second lens unit, (Gr2).

In many negative/positive two-component zoom lens systems, as in Preferred Embodiments 1 through 5, a second lens unit (Gr2) performs nearly all magnification change. A positive lens in the second lens unit (Gr2) changes the magnification of a virtual image produced by a negative lens in the first lens unit (Gr1), and a resolved image is formed, but the change by the second lens unit (Gr2) at such time is large, particularly at the telephoto side, which requires correction of second lens unit (Gr2) residual aberration (particularly axial chromatic aberration). If the second lens unit (Gr2) consists of one lens, chromatic aberration must be corrected, and a diffracting optical surface must therefore be provided. When a glass type exceeding the lower limit of the conditional expression (3) is used, a large secondary chromatic aberration results from the principles of color correction by the diffracting optical surface, and axial chromatic aberration at the wide angle side and the telephoto side can no longer be balanced.

When a diaphragm (S) is present near the front surface of a second lens unit (Gr2), as in Preferred Embodiments 1 through 5, it is preferable in terms of correcting chromatic aberration resulting from magnification rate that a diffracting optical surface be provided at the back surface. However, the diffracting optical surface optical power required to correct axial chromatic aberration and the diffracting optical surface optical power required to correct chromatic aberration resulting from magnification rate are generally not the same. It is therefore desirable in terms of correcting aberration to use a diffracting optical unit wherein a diffracting optical surface is provided on two surfaces of the second lens unit (Gr2), as in Preferred Embodiments 3 and 4. The provision of a diffracting optical surface on two surfaces corrects chromatic aberration resulting from magnification rate primarily at the rear diffracting optical surface, allowing insufficiently corrected axial chromatic aberration to be corrected at the front diffracting optical surface.

It is preferable that a second lens unit (Gr2) possess a strongly convex surface on its image (field) side, as in Preferred Embodiments 1 through 5. Adopting a construction in which a second lens unit (Gr2) possesses a strongly convex surface on its image side ensures image side telecentricity and affords good correction of curvature of field.

As in Preferred Embodiments 1 through 5, it is preferable in terms of correcting aberration that a diffracting optical surface be provided to a refractive lens wherein at least one surface consists of an aspherical surface, and it is further preferable in terms of correcting aberration to use a double-sided aspherical lens in the second lens unit (Gr2). An effect similar to that of an aspherical surface can be obtained from a diffracting optical surface by engineering the form of the phase function as desired. However, not only is the sign of chromatic aberration produced by a diffracting optical surface reversed in comparison to chromatic aberration produced by a refracting surface, the amount thereof is also larger (−2.67 dispersion value). Thus, when the phase function of a diffracting optical surface is objected to a large amount of aspherical surface phase change, the extent of chromatic aberration produced changes greatly as divergence from the optical axis progresses. As a result, the balance of spherical aberration in each color breaks down. It is therefore preferable that the majority of higher order aberration be corrected by a refracting lens, and a double-sided aspherical lens is ideal for this purpose. As in Preferred Embodiments 1 through 5, a double-sided aspherical lens is also preferable from the standpoint that when the second lens unit (Gr2), a mobile lens unit, consists of one lens, there is increased freedom for correction of aberration. There are various methods which serve as manufacturing methods when a diffracting optical surface is provided to a lens surface of a refracting lens. Examples include a method wherein a mold is used to form a lens having a diffracting optical surface, a compound molding method wherein a resin is molded on a lens surface of a refracting lens and the surface thereof is made into a diffraction grating, and a method wherein a diffracting optical surface is formed by anisotropic etching or the like.

It is preferable that, a diffracting optical surface be blazed (serrated). Blazing a diffracting optical surface raises diffracting efficiency. Methods for blazing a diffracting optical surface include a fabrication method wherein a semiconductor manufacturing technology or the like is used to form serrations resembling steps (binary optics), a method wherein a metal mold produced by an exacting cutting process is used to mold a glass or plastic material, and a method wherein a diffracting optical surface is molded in a resin layer formed on a glass lens.

The diffracting efficiency of a blazed diffracting optical surface can be raised to 100% per wavelength and per angle in scalar theory. When the designed phase function of the diffracting optical unit used in each preferred embodiment is converted to a contour function, blaze height becomes roughly 1 micron. Changes in diffracting efficiency resulting from the effect of the interfacial angle are thereby minimized up to an incident angle of roughly 30°. A wavelength-induced decline in diffracting efficiency affects image resolution performance in the form of higher order diffracted light but also allows reduction through optimization of design wavelengths or restriction of the usage wavelength range.

The following description concerns the treatment of chromatic aberration in an optical unit, possessing both a refracting optical surface and a diffracting optical surface (i.e., a refracting-diffracting hybrid optical unit), like the second and thirds lens elements (G2,G3) used in Preferred Embodiments 1 through 5. The following expression (A) defines axial chromatic aberration in a thin-film system (PAC).

$$PAC \propto \frac{\phi r}{vr} + \frac{\phi d}{vd} \quad (A)$$

wherein.

φr represents an optical power of refracting optical unit (optical power resulting from refracting effect), φd represents an optical power of diffracting optical unit (optical power resulting from diffracting effect), vr represents a dispersion value of refracting optical unit, and vd represents a dispersion value of diffracting optical unit.

The following expressions (B,C) describe the terms vr and vd in the above expression (A), respectively. As Expression C shows, the diffracting optical surface is characterized by its large negative dispersion value (−2.67) and its dispersion independent of form.

$$vr = \frac{Nd - 1}{NG - NC} \quad (B)$$

$$vr = \frac{\lambda d}{\lambda G - \lambda C} = -2.67 \quad (C)$$

wherein.

Nd represents a refractive index with respect to d-line.

NG represents a refractive index with respect to ray G-line,

NC represents a refractive index with respect to ray C-line,

λd represents a wavelength of ray d-line,

λG represents a wavelength of ray G-line, and

λC represents a wavelength of ray C-line.

A zoom lens system configuration embodying the present, invention is next described in further detail with reference to construction data and aberration drawings and the like. Preferred Embodiments 1 through 5 cited here as examples correspond respectively to the above-discussed Preferred Embodiments 1 through 5, and lens configuration drawings illustrating Preferred Embodiments 1 through 5 (FIGS. 1 through 5) describe respectively lens configurations in the corresponding Preferred Embodiments 1 through 5.

In construction data for each preferred embodiment, ri(i=1,2,3 . . .) indicates the radius of curvature of the i-th surface counting from the object side; di(i=1,2,3 . . .) indicates the i-th axial plane distance counting from the object, side; Ni(i=1,2,3. . .) indicates the index of refraction with respect to d-line for the i-th optical element counting from the object side; and i(i=1,2,3 . . .) indicates Abbe number. In the construction data, axial plane distances changed by zooming (variable distances) are axial, spatial distances between individual lens units; specifically, wide angle extreme (W) (short focal distance extreme), middle (M) (state of middle focal distance), and telephoto extreme (T) (long focal distance extreme). System focal distance f, interracial angle 2ω, and F-number FNO are indicated together with each focal distance state (W), (M), and (T).

Surfaces for which radius of curvature ri is marked by a (*) symbol comprise an aspherical surface, and said surfaces are defined by the following expression (AS) which describes the surface state of an aspherical surface. Surfaces for which radius of curvature ri is marked by a (#) symbol comprise a diffracting optical surface, and said surfaces are defined by the foregoing expression (DS) which describes the phase form of diffracting optical surface pitch (m=1 in all preferred embodiments). Aspherical surface data for each aspherical surface and diffracting optical surface data for each diffracting optical surface is shown together with additional data.

$$X(H) = \frac{C \cdot H^2}{1 + \sqrt{1 - \varepsilon \cdot C^2 \cdot H^2}} + \sum_{i \geq 2} A_i \cdot H^i \quad (AS)$$

wherein,

H represents a height of vertical orientation with respect to optical axis,

X(H) represents a displacement in optical axis direction at height H (plane apex standard), C represents a paraxial index of curvature, ε represents a conic parameter, and Ai represents an i-th aspherical surface coefficient.

TABLE 1

Embodiment 1
f = 3.340 ~ 5.500 ~ 9.650 (mm)
2ω = 58.2 ~ 37.4 ~ 21.8 (degree)
FNO = 2.54 ~ 3.50 ~ 4.10

| Radius of Curvature | Axial Distance | Refractive Index | Abbe Number |
|---|---|---|---|
| r1* = 4.233 | | | |
| | d1 = 0.400 | N1 = 1.76743 | v1 = 49.48 |
| r2* = 2.641 | | | |
| | d2 = 2.933 | | |
| r3* = 4.670 | | | |
| | d3 = 2.044 | N2 = 1.83350 | v2 = 21.00 |
| r4*# = 3.214 | | | |
| | d4 = 6.364 ~ 2.782 ~ 0.400 | | |
| r5 = ∞{Diaphragm(S)} | | | |
| | d5 = 0.100 | | |
| r6* = 24.412 | | | |
| | d6 = 2.800 | N3 = 1.49310 | v3 = 83.58 |
| r7*# = −2.980 | | | |
| | d7 = 0.938 ~ 2.976 ~ 6.892 | | |
| r8 = ∞ | | | |
| | d8 = 3.600 | N4 = 1.54426 | v4 = 69.60 |
| r9 = ∞ | | | |

[Aspherical Coefficient of 1st surface (r1)]

ε = 1.00000000
A4 = 2.4096709*10⁻³
A6 = 7.7614229*10⁻⁴

TABLE 1-continued

Embodiment 1
f = 3.340 ~ 5.500 ~ 9.650 (mm)
2ω = 58.2 ~ 37.4 ~ 21.8 (degree)
FNO = 2.54 ~ 3.50 ~ 4.10

A8 = −3.2095548*10$^{-5}$
[Aspherical Coefficient of 2nd surface (r2)]

$\epsilon$ = 1.00000000
A4 = 4.2248094*10$^{-4}$
A6 = 1.3071165*10$^{-3}$
A8 = 4.4105022*10$^{-5}$
[Aspherical Coefficient of 3rd surface (r3)]

$\epsilon$ = 1.00000000
A4 = −6.1274913*10$^{-3}$
A6 = 4.0416677*10$^{-4}$
[Aspherical Coefficient of 4th surface (r4)]

$\epsilon$ = 1.00000000
A4 = −1.5666886*10$^{-2}$
A6 = 1.4979941*10$^{-3}$
A8 = −2.0274521*10$^{-4}$
[Aspherical Coefficient of 6th surface (r6)]

$\epsilon$ = 1.00000000
A4 = −1.1836390*10$^{-2}$
A6 = 7.2806595*10$^{-5}$
A8 = −5.4745865*10$^{-4}$
A10 = −3.6590492*10$^{-5}$
[Aspherical Coefficient of 7th surface (r7)]

$\epsilon$ = 1.00000000
A4 = 2.4919773*10$^{-4}$
A6 = −1.7083995*10$^{-5}$
A8 = −4.7574664*10$^{-5}$
[Phase Coefficient of 4th surface (r4)]

R2 = 6.3751254*10$^{-3}$
[Phase Coefficient of 7th surface (r7)]

R2 = −3.6793989*10$^{-3}$
R4 = −5.8721570*10$^{-5}$

TABLE 2

Embodiment 2
f = 3.340 ~ 5.500 ~ 9.650 (mm)
2ω = 58.2 ~ 37.4 ~ 21.8 (degree)
FNO = 2.54 ~ 3.50 ~ 4.10

| Radius of Curvature | Axial Distance | Refractive Index | Abbe Number |
|---|---|---|---|
| r1* = 15.895 | | | |
| | d1 = 1.262 | N1 = 1.76743 | ν1 = 49.48 |
| r2* = 3.763 | | | |
| | d2 = 1.304 | | |
| r3* = 5.667 | | | |
| | d3 = 3.000 | N2 = 1.83350 | ν2 = 21.00 |
| r4*# = 4.421 | | | |
| | d4 = 5.179 ~ 2.309 ~ 0.400 | | |
| r5 = ∞{Diaphragm(S)} | | | |
| | d5 = 0.000 | | |
| r6*# = 16.380 | | | |
| | d6 = 3.000 | N3 = 1.49310 | ν3 = 83.58 |
| r7* = −2.888 | | | |
| | d7 = 0.727 ~ 2.975 ~ 7.294 | | |
| r8 = ∞ | | | |
| | d8 = 3.600 | N4 = 1.54426 | ν4 = 69.60 |
| r9 = ∞ | | | |

TABLE 2-continued

Embodiment 2
f = 3.340 ~ 5.500 ~ 9.650 (mm)
2ω = 58.2 ~ 37.4 ~ 21.8 (degree)
FNO = 2.54 ~ 3.50 ~ 4.10

[Aspherical Coefficient of 1st surface (r1)]

$\epsilon$ = 1.00000000
A4 = 7.5205270*10$^{-3}$
A6 = −9.5419788*10$^{-5}$
A8 = −7.9108339*10$^{-6}$
[Aspherical Coefficient of 2nd surface (r2)]

$\epsilon$ = 1.00000000
A4 = 1.1002107*10$^{-2}$
A6 = 1.7890219*10$^{-3}$
A8 = 1.6989267*10$^{-4}$
[Aspherical Coefficient of 3rd surface (r3)]

$\epsilon$ = 1.00000000
A4 = −3.9449187*10$^{-3}$
A6 = 7.6750573*10$^{-4}$
A8 = 1.5782164*10$^{-5}$
[Aspherical Coefficient of 4th surface (r4)]

$\epsilon$ = 1.00000000
A4 = −9.8278411*10$^{-3}$
A6 = 1.0407448*10$^{-3}$
A8 = −7.6206809*10$^{-5}$
[Aspherical Coefficient of 6th surface (r6)]

$\epsilon$ = 1.00000000
A4 = −1.0881678*10$^{-2}$
A6 = −6.6030538*10$^{-4}$
A8 = −1.8087742*10$^{-4}$
A10 = −6.4170689*10$^{-5}$
[Aspherical Coefficient of 7th surface (r7)]

$\epsilon$ = 1.00000000
A4 = 1.4511090*10$^{-3}$
A6 = −6.1466225*10$^{-5}$
A8 = −1.0313734*10$^{-5}$
[Phase Coefficient of 4th surface (r4)]

R2 = 7.3629437*10$^{-3}$
R4 = −6.9574648*10$^{-4}$
[Phase Coefficient of 6th surface (r6)]

R2 = −5.9784243*10$^{-3}$
R4 = −1.6593147*10$^{-4}$

TABLE 3

Embodiment 3
f = 3.340 ~ 5.680 ~ 9.650 (mm)
2ω = 56.6 ~ 35.2 ~ 21.1 (degree)
FNO = 2.54 ~ 3.10 ~ 4.10

| Radius of Curvature | Axial Distance | Refractive Index | Abbe Number |
|---|---|---|---|
| r1* = 19.076 | | | |
| | d1 = 0.800 | N1 = 1.75450 | ν1 = 51.57 |
| r2* = 4.892 | | | |
| | d2 = 1.203 | | |
| r3* = 6.277 | | | |
| | d3 = 3.000 | N2 = 1.84666 | ν2 = 23.82 |
| r4*# = 4.296 | | | |
| | d4 = 6.358 ~ 2.723 ~ 0.588 | | |
| r5 = ∞{Diaphragm(S)} | | | |
| | d5 = 0.100 | | |
| r6*# = 18.022 | | | |
| | d6 = 3.176 | N3 = 1.49310 | ν3 = 83.58 |

TABLE 3-continued

Embodiment 3
f = 3.340 ~ 5.680 ~ 9.650 (mm)
2ω = 56.6 ~ 35.2 ~ 21.1 (degree)
FNO = 2.54 ~ 3.10 ~ 4.10 r7*# = −3.021 d7 = 4.896 ~
7.164 ~ 11.011 r8 = ∞ d8 = 3.600    N4 = 1.54426    ν4 = 69.60 r9 = ∞

[Aspherical Coefficient of 1st surface (r1)]

$\epsilon$ = 1.00000000
A4 = 1.7704213*10$^{-2}$
A6 = −6.2479333*10$^{-4}$
A8 = −1.5176983*10$^{-5}$

[Aspherical Coefficient of 2nd surface (r2)]

$\epsilon$ = 1.00000000
A4 = 2.2422210*10$^{-2}$
A6 = 2.4218013*10$^{-3}$
A8 = 3.4614924*10$^{-4}$
A10 = −1.1900530*10$^{-4}$
A12 = 5.2834106*10$^{-6}$

[Aspherical Coefficient of 3rd surface (r3)]

$\epsilon$ = 1.00000000
A4 = −4.6031039*10$^{-3}$
A6 = 1.7477483*10$^{-3}$
A8 = −2.1531297*10$^{-4}$
A10 = −8.9077970*10$^{-8}$
A12 = 1.4228218*10$^{-6}$

[Aspherical Coefficient of 4th surface (r4)]

$\epsilon$ = 1.00000000
A4 = −1.2593208*10$^{-2}$
A6 = 2.1442579*10$^{-3}$
A8 = −4.7089638*10$^{-4}$
A10 = 2.6176474*10$^{-5}$

[Aspherical Coefficient of 6th surface (r6)]

$\epsilon$ = 1.00000000
A4 = −1.0682211*10$^{-2}$
A6 = −1.0550702*10$^{-3}$
A8 = 1.4167827*10$^{-4}$
A10 = −1.0157855*10$^{-4}$

[Aspherical Coefficient of 7th surface (r7)]

$\epsilon$ = 1.00000000
A4 = 1.1808530*10$^{-3}$
A6 = −2.0168018*10$^{-4}$
A8 = 3.6691023*10$^{-5}$
A10 = −4.0890286*10$^{-6}$

[Phase Coefficient of 4th surface (r4)]

R2 = 5.8769490*10$^{-3}$

[Phase Coefficient of 6th surface (r6)]

R2 = −1.8592257*10$^{-3}$
R4 = −6.9294939*10$^{-4}$

[Phase Coefficient of 7th surface (r7)]

R2 = −1.9404985*10$^{-3}$
R4 = 1.0074765*10$^{-4}$

TABLE 4

Embodiment 4
f = 3.340 ~ 5.680 ~ 9.650 (mm)
2ω = 56.6 ~ 35.2 ~ 21.1 (degree)
FNO = 2.54 ~ 3.10 ~ 4.10

| Radius of Curvature | Axial Distance | Refractive Index | Abbe Number |
|---|---|---|---|
| r1* = 100.000 | | | |
| | d1 = 0.800 | N1 = 1.75450 | ν1 = 51.57 |
| r2* = 4.716 | | | |
| | d2 = 0.926 | | |
| r3* = 5.006 | | | |
| | d3 = 3.000 | N2 = 1.84666 | ν2 = 23.82 |
| r4*# = 4.443 | | | |
| | d4 = 6.941 ~ 2.937 ~ 0.586 | | |
| r5 = ∞{Diaphragm(S)} | | | |
| | d5 = 0.100 | | |
| r6*# = 27.182 | | | |
| | d6 = 3.380 | N3 = 1.49310 | ν3 = 83.58 |
| r7*# = −3.068 | | | |
| | d7 = 4.911 ~ 7.165 ~ 10.986 | | |
| r8 = ∞ | | | |
| | d8 = 3.600 | N4 = 1.54426 | ν4 = 69.60 |
| r9 = ∞ | | | |

[Aspherical Coefficient of 1st surface (r1)]

$\epsilon$ = 1.00000000
A4 = 1.6614090*10$^{-2}$
A6 = −9.4613166*10$^{-4}$
A8 = 8.1982220*10$^{-6}$

[Aspherical Coefficient of 2nd surface (r2)]

$\epsilon$ = 1.00000000
A4 = 1.7239183*10$^{-2}$
A6 = 2.1992477*10$^{-3}$
A8 = 2.2239041*10$^{-4}$
A10 = −1.1064369*10$^{-4}$
A12 = 6.7600109*10$^{-6}$

[Aspherical Coefficient of 3rd surface (r3)]

$\epsilon$ = 1.00000000
A4 = −6.7596727*10$^{-3}$
A6 = 1.8703213*10$^{-3}$
A8 = −1.6763363*10$^{-4}$
A10 = −6.8743446*10$^{-6}$
A12 = 1.8013972*10$^{-6}$

[Aspherical Coefficient of 4th surface (r4)]

$\epsilon$ = 1.00000000
A4 = −1.2043298*10$^{-2}$
A6 = 2.0686306*10$^{-3}$
A8 = −4.3883134*10$^{-4}$
A10 = 3.0161085*10$^{-5}$

[Aspherical Coefficient of 6th surface (r6)]

$\epsilon$ = 1.00000000
A4 = −9.6695261*10$^{-3}$
A6 = −6.0140199*10$^{-4}$
A8 = −3.6310251*10$^{-5}$
A10 = 5.7609604*10$^{-5}$

[Aspherical Coefficient of 7th surface (r7)]

$\epsilon$ = 1.00000000
A4 = 1.3621595*10$^{-3}$
A6 = −1.3319191*10$^{-4}$
A8 = 3.3759508*10$^{-5}$
A10 = −3.0091588*10$^{-6}$

[Phase Coefficient of 4th surface (r4)]

R2 = 4.0780988*10$^{-3}$

[Phase Coefficient of 6th surface (r6)]

R2 = −3.4366634*10$^{-3}$
R4 = −3.6918886*10$^{-4}$

TABLE 4-continued

Embodiment 4
f = 3.340 ~ 5.680 ~ 9.650 (mm)
2ω = 56.6 ~ 35.2 ~ 21.1 (degree)
FNO = 2.54 ~ 3.10 ~ 4.10

[Phase Coefficient of 7th surface (r7)]

R2 = −1.0499820*10$^{-3}$
R4 = 1.5981976*10$^{-5}$

TABLE 5

Embodiment 5
f = 3.340 ~ 5.500 ~ 9.650 (mm)
2ω = 58.2 ~ 37.4 ~ 21.8 (degree)
FNO = 2.54 ~ 3.50 ~ 4.10

| Radius of Curvature | Axial Distance | Refractive Index | Abbe Number |
|---|---|---|---|
| r1* = 136.023 | | | |
| | d1 = 0.901 | N1 = 1.76743 | ν1 = 49.48 |
| r2* = 7.243 | | | |
| | d2 = 1.148 | | |
| r3* = 5.903 | | | |
| | d3 = 1.751 | N2 = 1.84506 | ν2 = 23.66 |
| r4*# = 4.407 | | | |
| | d4 = 7.278 ~ 3.147 ~ 0.400 | | |
| r5 = ∞{Diaphragm(S) | | | |
| | d5 = 0.000 | | |
| r6* = 102.780 | | | |
| | d6 = 3.298 | N3 = 1.51178 | ν3 = 69.07 |
| r7*# = −3.061 | | | |
| | d7 = 1.076 ~ 2.981 ~ 6.642 | | |
| r8 = ∞ | | | |
| | d8 = 3.600 | N4 = 1.54426 | ν4 = 69.60 |
| r9 = ∞ | | | |

[Aspherical Coefficient of 1st surface (r1)]

ε = 1.00000000
A4 = 1.5761237*10$^{-2}$
A6 = −4.3705196*10$^{-4}$
A8 = 5.2070776*10$^{-6}$
[Aspherical Coefficient of 2nd surface (r2)]

ε = 1.00000000
A4 = 1.9444735*10$^{-2}$
A6 = 2.5748322*10$^{-3}$
A8 = 9.2066400*10$^{-5}$
[Aspherical Coefficient of 3rd surface (r3)]

ε = 1.00000000
A4 = −7.7284232*10$^{-3}$
A6 = −2.1151530*10$^{-3}$
A8 = −1.6575468*10$^{-4}$
[Aspherical Coefficient of 4th surface (r4)]

ε 1.00000000
A4 = −1.4192133*10$^{-2}$
A6 = 2.4903031*10$^{-3}$
A8 = −3.6125386*10$^{-4}$
[Aspherical Coefficient of 6th surface (r6)]

ε = 1.00000000
A4 = −1.0226135*10$^{-2}$
A6 = −3.1594281*10$^{-4}$
A8 = −5.1456928*10$^{-4}$
A10 = 2.4408263*10$^{-5}$
[Aspherical Coefficient of 7th surface (r7)]

ε = 1.00000000
A4 = 9.7831029*10$^{-4}$
A6 = −1.2341501*10$^{-4}$

TABLE 5-continued

Embodiment 5
f = 3.340 ~ 5.500 ~ 9.650 (mm)
2ω = 58.2 ~ 37.4 ~ 21.8 (degree)
FNO = 2.54 ~ 3.50 ~ 4.10

A8 = 9.7318192*10$^{-6}$
[Phase Coefficient of 4th surface (r4)]

R2 = 7.1757128*10$^{-3}$
R4 = −7.6586412*10$^{-4}$
[Phase Coefficient of 7th surface (r7)]

R2 = −4.6817670*10$^{-3}$
R4 = 4.6372754*10$^{-5}$

Figures 7A, 7B, 7C:
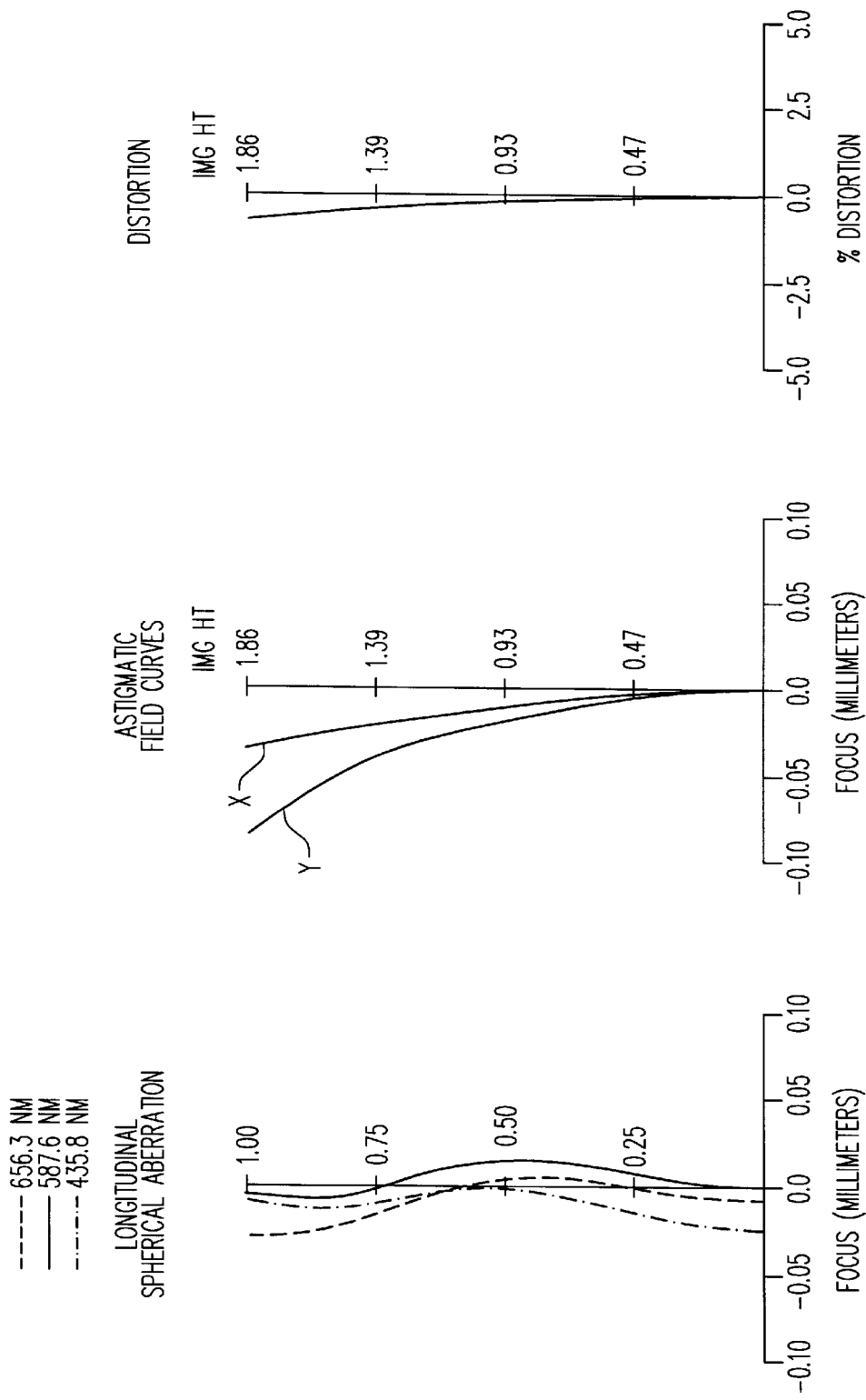
FIG. 7 is an aberration drawing at the middle (M) of Preferred Embodiment 1.
Figure 8C:
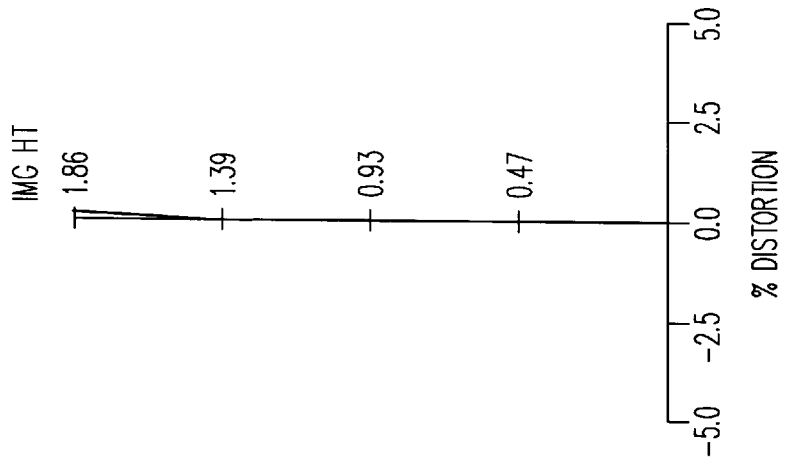
FIG. 8 is an aberration drawing at the telephoto extreme (T) of Preferred Embodiment 1.
Figure 8B:
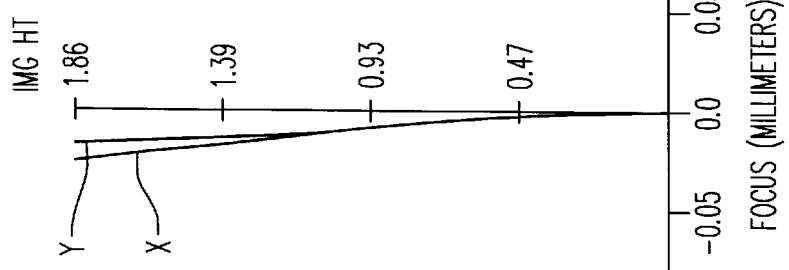
Figure 8A:
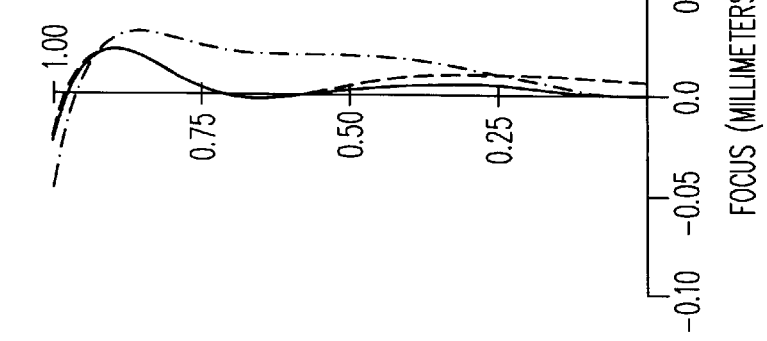

FIGS. 6 through 8 are aberration drawings pertaining to Preferred Embodiment 1; FIGS. 9 through 11 are aberration drawings pertaining to Preferred Embodiment 2; FIGS. 12–14 are aberration drawings pertaining to Preferred Embodiment 3; FIGS. 15–17 are aberration drawings pertaining to Preferred Embodiment 4; FIGS. 18–20 are aberration drawings pertaining to Preferred Embodiment 5; and each figure indicates aberration at a wide angle extreme (W), middle (state of middle focal distance) (M), and telephoto extreme (T). Aberration drawings at each focal distance state illustrate, from the left, longitudinal spherical aberration (a), astigmatic field curves (b), and % distortion (c); dotted lines indicate aberration with respect to C-line (wavelength: λC=856.3 nm); solid lines indicate aberration with respect to d-line (wavelength: λd=587.6 nm); and dot-and-dash lines indicate aberration with respect to G-line (wavelength: λG=435.8 nm). The vertical axis for longitudinal spherical aberration (horizontal axis, mm) indicates incident ray height values standardized by the maximum height thereof, and the vertical axes for astigmatic field curves (horizontal axis, mm) and % distortion (horizontal axis, %) indicate image height, (IMGHT, mm). The solid line X indicates the astigmatic field curve in the sagittal plane, and the solid line Y indicates the astigmatic field curve in the meridional plane.

Table 6 indicates values corresponding to conditional expressions for each preferred embodiment.

TABLE 6

| | Embodiment 1 | Embodiment 2 | Embodiment 3 | Embodiment 4 | Embodiment 5 |
|---|---|---|---|---|---|
| $\phi 1f / \phi 1$ | 0.55 | 0.72 | 0.62 | 0.88 | 0.63 |
| $\left\vert \phi d / \phi \right\vert$ | 0.072 (1st unit) 0.039 (2nd unit) | 0.071 (1st unit) 0.060 (2nd unit) | 0.065 (1st unit) 0.041 (2nd unit) | 0.047 (1st unit) 0.050 (2nd unit) | 0.091 (1st unit) 0.052 (2nd unit) |
| ν2 | 83.53 | 83.53 | 83.53 | 83.53 | 69.07 |

As described above, the present invention employs a diffracting optical surface in a negative/positive two-component zoom lens system construction and thereby brings about a compact and low cost yet high-performance zoom lens system using a small number of structural lenses. In other words, compactness and low cost are achieved by reducing the number of lenses to an extent not achievable by means of conventional refracting lenses alone, while performance satisfactory for a CCD or other such imaging unit (wide angle F-number of approximately 2.5 at a comparatively large zoom ratio of approximately 3) is maintained axially and off-axis.

Although the present invention has been fully described by way of examples with reference to the accompanying drawings, it is to be noted that various changes and modifications will be apparent to those skilled in the art. Therefore, unless such changes and modifications otherwise depart from the scope of the present invention, they should be construed as being included therein.

What is claimed is:

1. A zoom lens system comprising from the object side,
   a first lens unit having a negative optical power and including at least one diffractive optical surface; and
   a second lens unit having a positive optical power and including at least one diffractive optical surface,
   wherein a distance between the first and second lens units varies during zooming operation, and
   wherein the diffractive optical surface of said lens units in the zoom lens system fulfills the following condition:

$$0.02 < \left|\frac{\phi d}{\phi}\right| < 0.1$$

wherein
   $\phi d$ represents an optical power resulting from the diffractive effect of an individual lens unit, and
   $\phi$ represents an optical power of an individual lens unit, and
   the following equations (a) and (b) describe $\phi d$ and $\phi$ respectively:

$\phi d = -2mR2$             (a)

$\phi = \phi r + \phi d$             (b)

wherein,
   m represents a degree of diffraction,
   R2 represents a second order phase coefficient, and
   $\phi r$ represents an optical power resulting from the refractive effect of an individual lens unit.

2. A zoom lens system as claimed in claim 1, wherein the first lens unit has
   a negative lens element provided at its object side.

3. A zoom lens system as claimed in claim 2, wherein the negative lens element is a meniscus lens convex to its object side.

4. A zoom lens system as claimed in claim 2, wherein the negative lens element fulfills the following condition:

$$0.4 < \frac{\phi 1f}{\phi 1} < 1.3$$

wherein,
   $\phi 1f$ represents an optical power of a negative lens element of the first lens unit, and
   $\phi 1$ represents a total optical power of the first lens unit.

5. A zoom lens system comprising, from the object side,
   a first lens unit having a negative optical power and including at least one diffractive optical surface; and
   a second lens unit consisting of one lens element and having a positive optical power and including at least one diffractive optical surface,
   wherein a distance between the first and second lens units varies during zooming operation.

6. A zoom lens system as claimed in claim 5, wherein the lens element of the second lens unit has an integral diaphragm.

7. A zoom lens system as claimed in claim 5,
   wherein a positive lens element included in the second lens unit fulfills the following condition:

v2>60 wherein,
   v2 represents a dispersion value of a positive lens element of the second lens unit.

8. A zoom lens system as claimed in claim 1,
   wherein the first and second lens units are moved during zooming operation.

9. An optical system for forming an image of an object on a solid-state imaging device comprising, from the object side,
   a first lens unit having a negative optical power and including at least one diffractive optical surface;
   a second lens unit having a positive optical power and including at least one diffractive optical surface; and
   a filter provided between the second lens unit and the solid-state imaging device,
   wherein a distance between the first and second lens units varies during zooming operation, and
   wherein the diffractive optical surface including the optical system fulfills the following condition:

$$0.02 < \left|\frac{\phi d}{\phi}\right| < 0.1$$

wherein
   $\phi d$ represents an optical power resulting from the diffractive effect of an individual lens unit, and
   $\phi$ represents an optical power of an individual lens unit, and the following equations (a) and (b) describe $\phi d$ and $\phi$ respectively:

$\phi d = -2mR2$             (a)

$\phi = \phi r + \phi d$             (b)

wherein,
   m represents a degree of diffraction,
   R2 represents a second order phase coefficient, and
   $\phi r$ represents an optical power resulting from refractive effect of individual lens unit.

10. An optical system as claimed in claim 9, wherein the first lens unit has
    a negative lens element provided at its object side.

11. An optical system as claimed in claim 10, wherein the negative lens element is a meniscus lens convex to its object side.

12. An optical system as claimed in claim 10, wherein the negative lens element fulfills the following condition:

$$0.4 < \frac{\phi 1f}{\phi 1} < 1.3$$

wherein,
   $\phi 1f$ represents an optical power of a negative lens element of the first lens unit, and
   $\phi 1$ represents a total optical power of the first lens unit.

13. An optical system for forming an image of an object on a solid-state imaging device comprising, from the object side,
- a first lens unit having a negative optical power and including at least one diffractive optical surface;
- a second lens unit consisting of one lens element and having a positive optical power and including at least one diffractive optical surface; and
- a filter provided between the second lens unit and the solid-state imaging device,
- wherein a distance between the first and second lens units varies during zooming operation.

14. An optical system as claimed in claim 13, wherein the lens element of the second lens unit has an integral diaphragm.

15. An optical system as claimed in claim 13,
wherein a positive lens element included in the second lens unit fulfills the following condition:

$$\nu 2 > 60$$

wherein,
$\nu 2$ represents a dispersion value of a positive lens element of the second lens unit.

16. An optical system as claimed in claim 9,
wherein the first and second lens units are moved during zooming operation.

17. An optical system as claimed in claim 9,
wherein the filter is fixed during zooming operation.

18. A zoom lens system comprising, from the object side,
- a first lens unit having a negative optical power and a negative lens element provided at its object side, and including at least one diffractive optical surface; and
- a second lens unit having a positive optical power and including at least one diffractive optical surface,
- wherein a distance between the first and second lens units varies during zooming operation, and
- wherein the negative lens element fulfills the following condition:

$$0.4 < \frac{\phi 1 f}{\phi 1} < 1.3$$

wherein,
$\phi 1 f$ represents an optical power of a negative lens element of the first lens unit, and
$\phi 1$ represents a total optical power of the first lens unit.

19. A zoom lens system comprising, from the object side,
- a first lens unit having a negative optical power and including at least one diffractive optical surface; and
- a second lens unit having a positive optical power and including at least two diffractive optical surfaces,
- wherein a distance between the first and second lens units varies during a zooming operation.

20. The zoom lens system of claim 19 wherein said two diffractive optical surfaces are respectively located on the object side and the image side of said second lens unit.

21. The zoom lens system of claim 20 wherein said second lens unit comprises a single lens element, and said two diffractive optical surfaces are respectively located on opposite surfaces of said lens element.

22. An optical system for forming an image of an object on a solid-state imaging device comprising, from the object side,
- a first lens unit having a negative optical power and a negative lens element provided at its object side, and including at least one diffractive optical surface;
- a second lens unit having a positive optical power and including at least one diffractive optical surface; and
- a filter provided between the second lens unit and the solid-state imaging device,
- wherein a distance between the first and second lens units varies during zooming operation, and
- wherein the negative lens element fulfills the following condition:

$$0.4 < \frac{\phi 1 f}{\phi 1} < 1.3$$

wherein,
$\phi 1 f$ represents an optical power of a negative lens element of the first lens unit, and
$\phi 1$ represents a total optical power of the first lens unit.

23. An optical system for forming an image of an object on a solid-state imaging device comprising, from the object side,
- a first lens unit having a negative optical power and including at least one diffractive optical surface;
- a second lens unit having a positive optical power and including at least two diffractive optical surfaces; and
- a filter provided between the second lens unit and the solid-state imaging device,
- wherein a distance between the first and second lens units varies during a zooming operation.

24. The optical system of claim 23, wherein said two diffractive optical surfaces are respectively located on the object side and the image side of said second lens unit.

25. The optical system of claim 24, wherein said second lens unit comprises a single lens element, and said two diffractive optical surfaces are respectively located on opposite surfaces of said lens element.

26. The zoom lens system of claim 5, wherein the lens element of said second lens unit is a double-sided aspherical lens.

27. The optical system of claim 13, wherein the lens element of said second lens unit is a double-sided aspherical lens.

* * * * *